United States Patent [19]
Ooya et al.

[11] 3,744,854
[45] July 10, 1973

[54] DIGITAL-TYPE BRAKE-CONTROL METHOD AND SYSTEM

[75] Inventors: Junichiro Ooya; Kazutaka Kuwana; Takashi Hida; Katuki Takayama; Akira Tarao, all of Kariya-shi, Japan

[73] Assignee: Aisin Seiki Kabushiki Kaisha, Kariya-shi, Aichi-ken, Japan

[22] Filed: Aug. 9, 1971

[21] Appl. No.: 170,241

[30] Foreign Application Priority Data
Aug. 9, 1970  Japan ............................... 45/69462
Sept. 10, 1970  Japan ............................... 45/79608
Sept. 10, 1970  Japan ............................... 45/79609
Sept. 16, 1970  Japan ............................... 45/81093

[52] U.S. Cl. ............. 303/21 P, 188/181 C, 303/20, 303/21 CF, 303/21 CG, 324/161, 340/52 R, 340/263
[51] Int. Cl. ............................................. B60t 8/10
[58] Field of Search ............... 188/181 C; 303/21 P, 303/21 EB, 21 CF; 317/5; 318/52; 324/160–161; 340/52 R, 263; 235/92 EV

[56] References Cited
UNITED STATES PATENTS
3,608,978  9/1971  Neisch ........................... 303/21 EB
3,624,649  11/1971  Ranieri ........................... 235/92 EV
3,652,135  3/1972  Baumann ........................ 303/21 CF

*Primary Examiner*—Malcolm A. Morrison
*Assistant Examiner*—R. Stephen Dildine, Jr.
*Attorney*—Holman & Stern

[57] ABSTRACT

A digital type brake control system for a vehicle using a hydraulic brake system, wherein the hydraulic brake system of a vehicle is controlled by detecting the rotational state of a wheel of the vehicle to produce a detection output, converting this output into a pulse signal, comparing and calculating the difference between the number of the pulses of this signal counted from any given first instant for a specific period and the number of the pulses counted from an instant other than the first instant for a specific period, determining whether this difference is greater or less than a predetermined reference pulse number, and accordingly, producing a pressure-variation signal thereby to vary the hydraulic pressure in the brake system. All operations are accomplished through the consistent use of only digital signals.

14 Claims, 39 Drawing Figures

FIG. 12

| DECODER FOR CONTROL | RESET SIGNAL | ADDITION SIGNAL | | | | | | | | | | | | | | GATE SIGNAL | SUBTRACTION SIGNAL | | | | | | | | | | | | | | SET SIGNAL |
|---|---|---|---|---|---|---|---|---|---|---|---|---|---|---|---|---|---|---|---|---|---|---|---|---|---|---|---|---|---|---|---|
| CLOCK-PULSE | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| F.F.1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| F.F.2 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| F.F.3 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 |
| F.F.4 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| F.F.5 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |

FIG. 14

| DECODER FOR CONTROL | RESET SIGNAL | ADDITION SIGNAL T1 | | | | | | | | | | | | | | | GATE SIGNAL | SUBTRACTION SIGNAL T2 | | | | | | | | | | | | | | SET SIGNAL |
|---|---|---|---|---|---|---|---|---|---|---|---|---|---|---|---|---|---|---|---|---|---|---|---|---|---|---|---|---|---|---|---|
| CLOCK-PULSE | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| F.F.1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| F.F.2 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| F.F.3 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 |
| F.F.4 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| F.F.5 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |

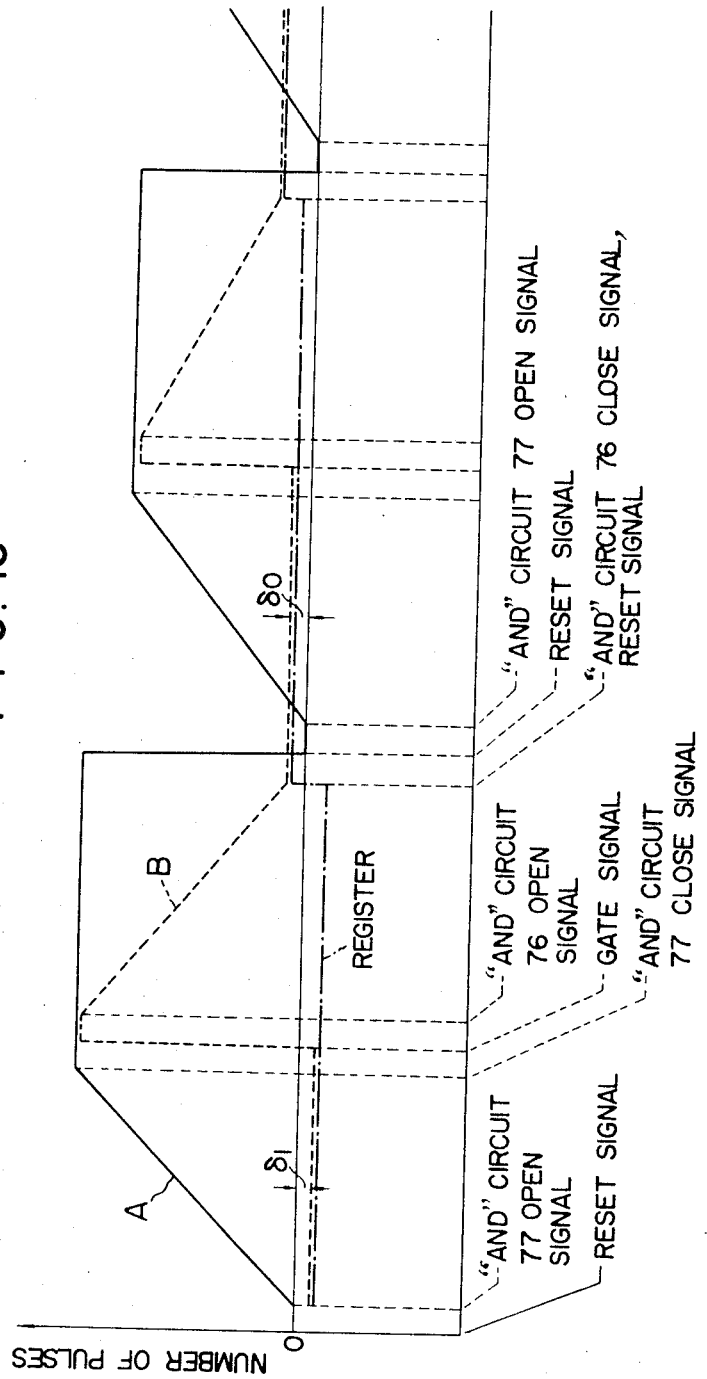

FIG. 15

| OUTPUT OF COMPARISON DECODER 78 | DECIMAL OUTPUT | REGISTER CIRCUIT OUTPUT |||||||||| |
|---|---|---|---|---|---|---|---|---|---|---|
| | | F.F.1 | F.F.2 | F.F.3 | F.F.4 | F.F.5 | F.F.6 | F.F.7 | F.F.8 | F.F.9 | F.F.10 |
| PRESSURE INCREASE START SIGNAL (87) | -512 | O | O | — | O | O | O | O | O | O | O |
| | -511 | — | O | O | O | O | O | O | O | O | O |
| | -510 | O | — | O | O | O | O | O | O | O | O |
| | ⋮ | | | | | | | | | | |
| | 6 | O | — | — | O | — | — | — | — | — | — |
| | 5 | — | — | — | O | — | — | — | — | — | — |
| | 4 | O | O | — | — | — | — | — | — | — | — |
| | 3 | — | O | — | — | — | — | — | — | — | — |
| | 2 | O | — | — | — | — | — | — | — | — | — |
| | 1 | — | — | — | — | — | — | — | — | — | — |
| PRESSURE REDUCTION START SIGNAL (88) | 0 | O | O | O | O | O | O | O | O | O | O |
| | 1 | — | O | O | O | O | O | O | O | O | O |
| | 2 | O | — | O | O | O | O | O | O | O | O |
| | 3 | — | — | O | O | O | O | O | O | O | O |
| | 4 | O | O | — | O | O | O | O | O | O | O |
| | 5 | — | O | — | O | O | O | O | O | O | O |
| | 6 | O | — | — | O | O | O | O | O | O | O |
| | 7 | — | — | — | O | O | O | O | O | O | O |
| | 8 | O | O | O | — | O | O | O | O | O | O |
| | 9 | — | O | O | — | O | O | O | O | O | O |
| | 10 | O | — | O | — | O | O | O | O | O | O |
| | 11 | — | — | O | — | O | O | O | O | O | O |
| | 12 | O | O | — | — | O | O | O | O | O | O |
| | 13 | — | O | — | — | O | O | O | O | O | O |
| | 14 | O | — | — | — | O | O | O | O | O | O |
| | 15 | — | — | — | — | O | O | O | O | O | O |
| | 16 | O | O | O | O | — | O | O | O | O | O |
| | 17 | — | O | O | O | — | O | O | O | O | O |
| | 18 | O | — | O | O | — | O | O | O | O | O |
| | 19 | — | — | O | O | — | O | O | O | O | O |
| | 20 | O | O | — | O | — | O | O | O | O | O |
| | ⋮ | | | | | | | | | | |
| | 507 | — | — | O | — | — | — | — | — | — | O |
| | 508 | O | O | — | — | — | — | — | — | — | O |
| | 509 | — | O | — | — | — | — | — | — | — | O |
| | 510 | O | — | — | — | — | — | — | — | — | O |
| | 511 | — | — | — | — | — | — | — | — | — | O |

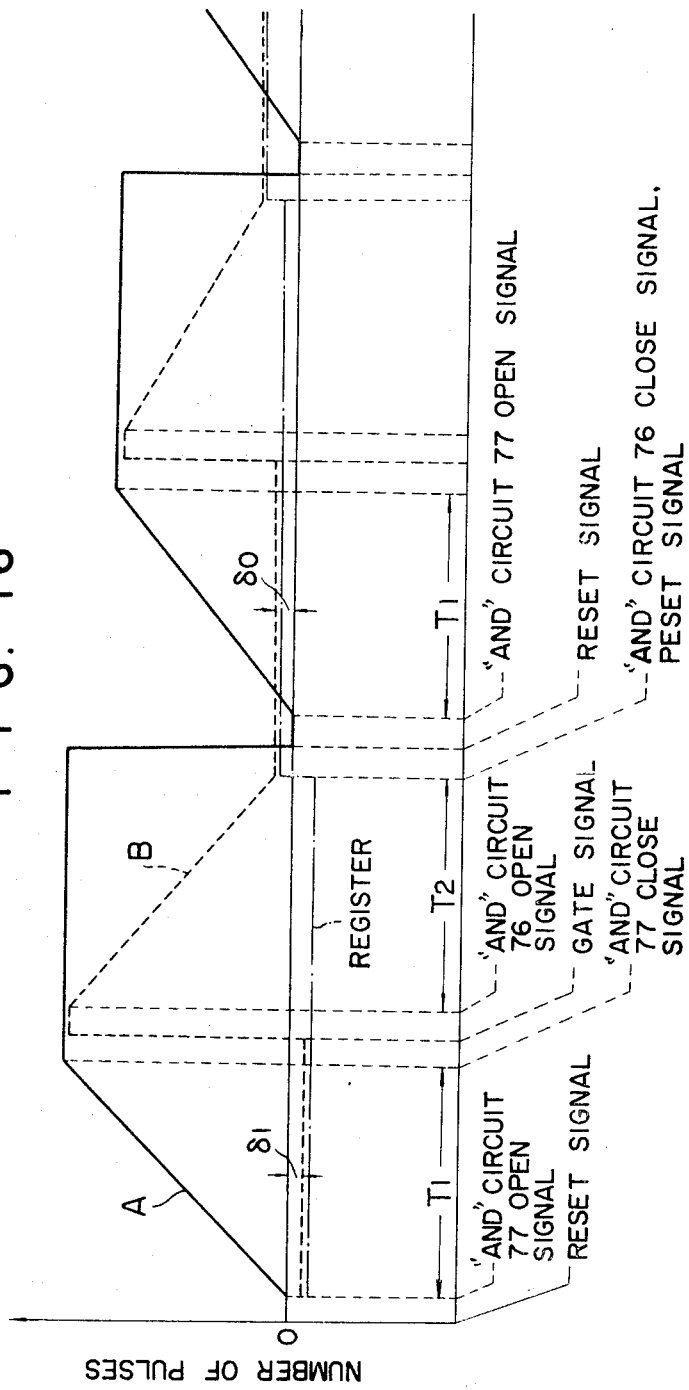

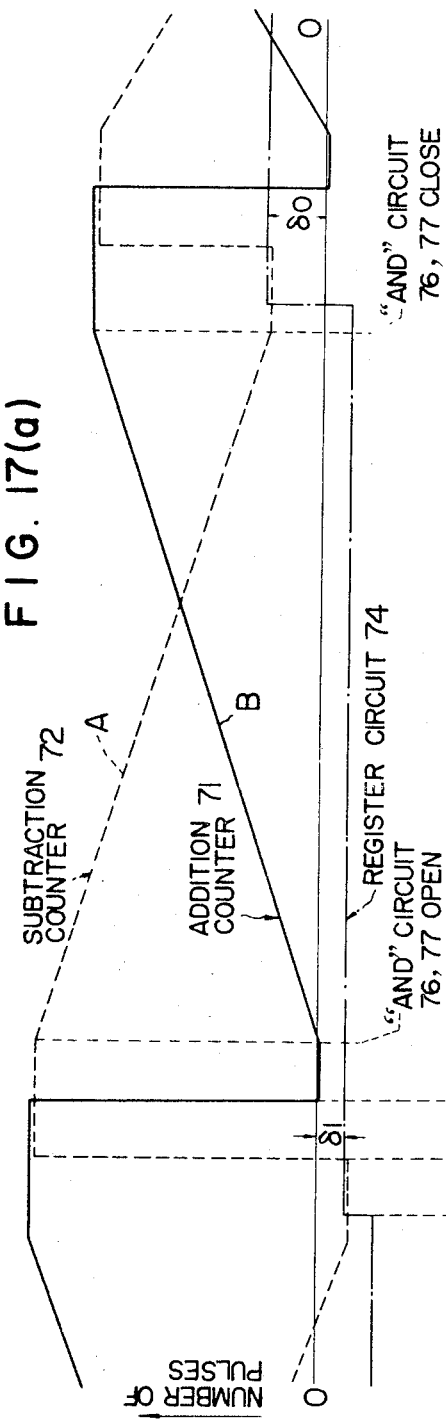

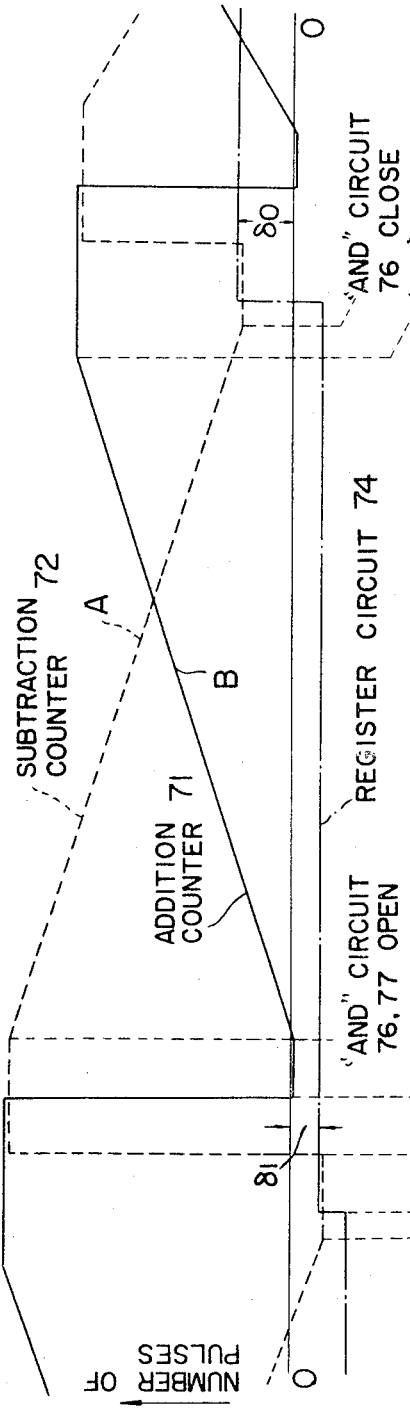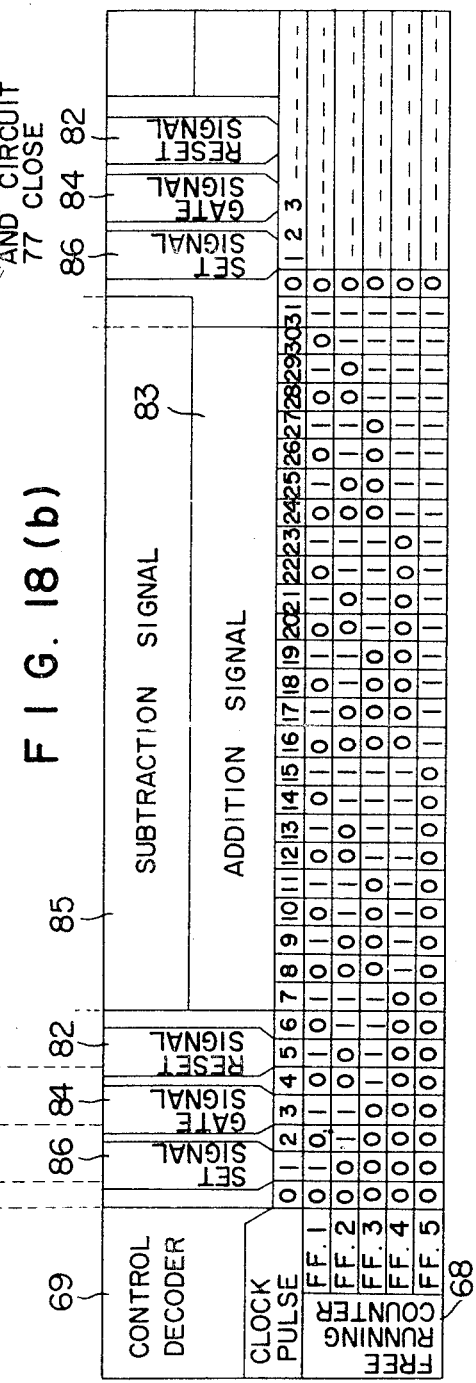

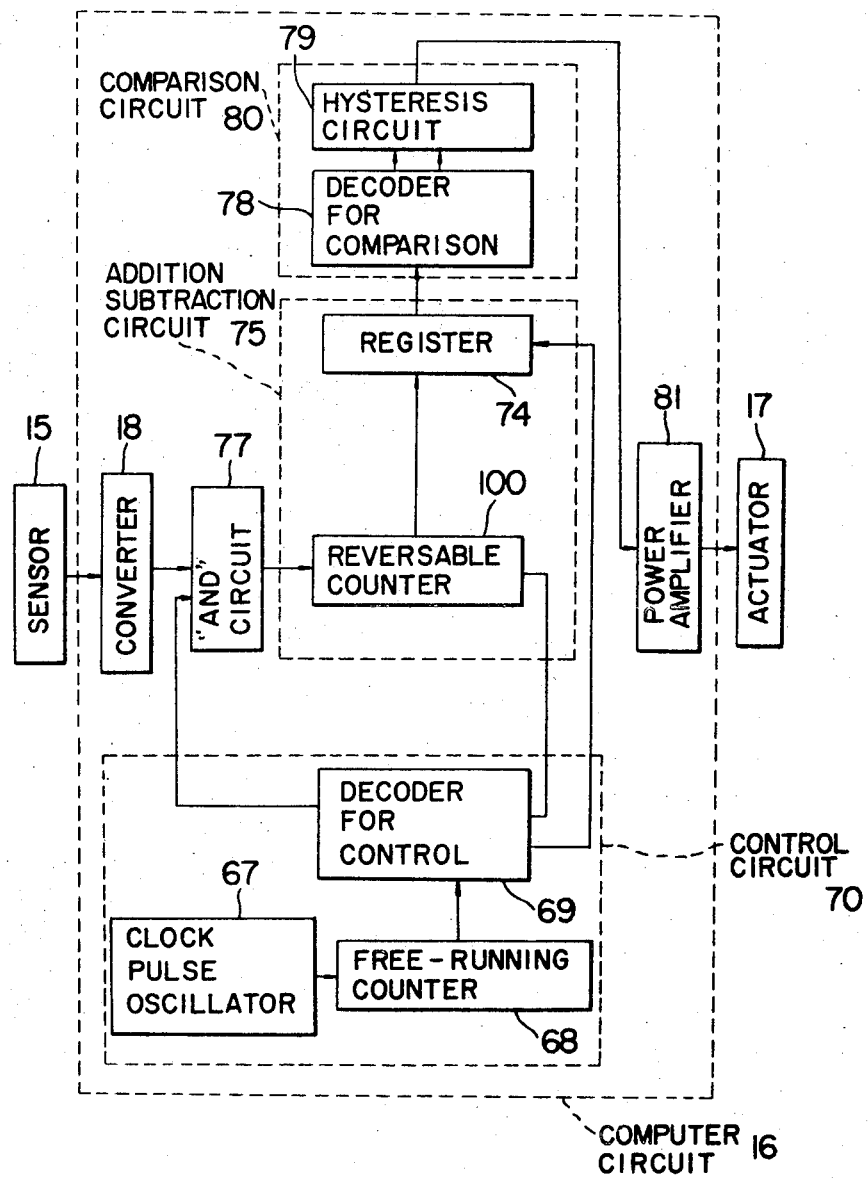
F I G. 19

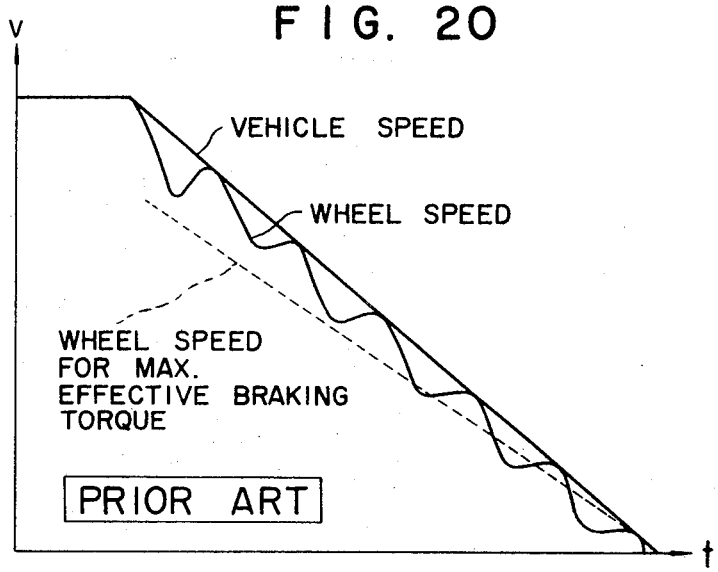
FIG. 20 — PRIOR ART
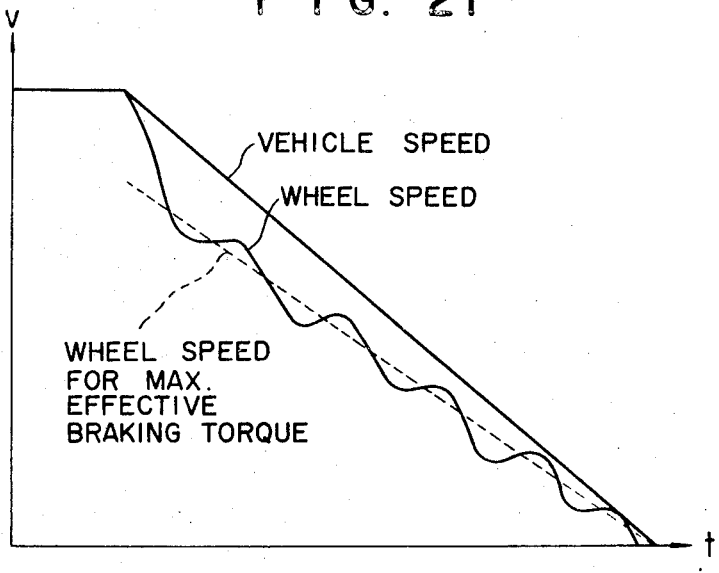
FIG. 21

FIG. 26(a)

| COUNT | 0 1 2 3 4 5 6 7 8 9 10 11 12 13 14 15 |
|---|---|
| A OUTPUT OF COUNTER B101 | L H L H L H L H L H L H L H L H |
| B OUTPUT OF COUNTER B101 | L L H H L L H H L L H H L L H H |
| C OUTPUT OF COUNTER B101 | L L L L H H H H L L L L H H H H |
| D OUTPUT OF COUNTER B101 | L L L L L L L L H H H H H H H H |
| A OUTPUT OF COUNTER B102 | L L L L L L L L L L L L L L L L |
| B OUTPUT OF COUNTER B102 | L L L L L L L L L L L L L L L L |
| C OUTPUT OF COUNTER B102 | L L L L L L L L L L L L L L L L |
| D OUTPUT OF COUNTER B102 | L L L L L L L L L L L L L L L L |
| OUTPUT OF NAND ELEMENT M104 | H H H H H H H H H H H H H H H H |
| D INPUT OF DECODER G101 | H L H L H L H L H L H L H L H L |
| 0 OUTPUT OF DECODER G101 | H Ⓛ H H H H H H H H H H H H H H |
| 1 OUTPUT OF DECODER G101 | H H H Ⓛ H H H H H H H H H H H H |
| 2 OUTPUT OF DECODER G101 | H H H H H Ⓛ H H H H H H H H H H |
| 3 OUTPUT OF DECODER G101 | H H H H H H H Ⓛ H H H H H H H H |
| 4 OUTPUT OF DECODER G101 | H H H H H H H H H Ⓛ H H H H H H |
| 5 OUTPUT OF DECODER G101 | H H H H H H H H H H H Ⓛ H H H H |
| 6 OUTPUT OF DECODER G101 | H H H H H H H H H H H H H Ⓛ H H |
| 7 OUTPUT OF DECODER G101 | H H H H H H H H H H H H H H H Ⓛ |
| 0 OUTPUT OF DECODER G102 | L L L L L L L L L L L L L L L L |
| 1 OUTPUT OF DECODER G102 | H H H H H H H H H H H H H H H H |

FIG. 26(b)

| I | | |
|---|---|---|
| | 16 17 18 19 20 21 22 23 24 25 26 27 28 29 30 31 | 32 33 34 35 36 37 38 39 40 41 42 43 44 45 46 47 |
| | | 48 ~ 63 |
| | | 64 ~ 79 |
| | | 80 ~ 95 |
| | | 96 ~ 111 |
| | | 112 ~ 127 |
| | | 128 ~ 143 |
| | | 144 ~ 159 |
| | | 160 ~ 175 |
| | | 176 ~ 191 |
| | | 192 ~ 207 |
| | | 208 ~ 223 |
| | | 224 ~ 239 |
| | | 240 ~ 255 |
| | L H L H L H L H L H L H L H L H | L H L H L H L H L H L H L H L H |
| | L L H H L L H H L L H H L L H H | L L H H L L H H L L H H L L H H |
| | L L L L H H H H L L L L H H H H | L L L L H H H H L L L L H H H H |
| | L L L L L L L L H H H H H H H H | L L L L L L L L H H H H H H H H |
| | H H H H H H H H H H H H H H H H | |
| | L L L L L L L L L L L L L L L L | |
| | L L L L L L L L L L L L L L L L | |
| | L L L L L L L L L L L L L L L L | |
| | L L L L L L L L L L L L L L L L | L L L L L L L L L L L L L L L L |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | L L L L L L L L L L L L L L L L | H H H H H H H H H H H H H H H H |

WHEN MI05 IS H

MI08 OUTPUT H
MI07 OUTPUT H

| NUMBER OF PULSES RESULTING FROM SUBTRACTION OF FI07 TO FI12 | -15 | -14 | -13 | -12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|---|---|---|---|---|---|---|---|---|---|---|---|---|---|---|
| FI07Q OUTPUT | H | L | H | L | H | L | H | L | H | L | H | L | H | L | H | L | H | L | H | L | H | L | H | L | H | L | H | L | H | L | H | L | H | L | H | L | H | L | H | L |
| FI08Q OUTPUT | L | H | H | L | L | H | H | L | L | H | H | L | L | H | H | L | L | H | H | L | L | H | H | L | L | H | H | L | L | H | H | L | L | H | H | L | L | H | H | L |
| FI09Q OUTPUT | L | L | L | H | H | H | H | L | L | L | L | H | H | H | H | L | L | L | L | H | H | H | H | L | L | L | L | H | H | H | H | L | L | L | L | H | H | H | H | L |
| FI10Q OUTPUT | L | L | L | L | L | L | L | H | H | H | H | H | H | H | H | L | L | L | L | L | L | L | L | H | H | H | H | H | H | H | H | L | L | L | L | L | L | L | L | H |
| FI11Q OUTPUT | H | H | H | H | H | H | H | H | H | H | H | H | H | H | H | L | L | L | L | L | L | L | L | L | L | L | L | L | L | L | L | H | H | H | H | H | H | H | H | H |
| FI12Q OUTPUT | H | H | H | H | H | H | H | H | H | H | H | H | H | H | H | L | L | L | L | L | L | L | L | L | L | L | L | L | L | L | L | H | H | H | H | H | H | H | H | H |
| FI13Q OUTPUT | H | H | H | H | H | H | H | H | H | H | H | H | H | H | H | L | L | L | L | L | L | L | L | H | H | H | H | H | H | H | H | H | H | H | H | H | H | H | H | H |
| FI14Q OUTPUT | L | L | L | L | L | L | L | L | L | L | L | L | L | L | L | L | L | L | L | L | L | L | L | H | H | H | H | H | H | H | H | H | H | H | H | H | H | H | H | H |
| FI15Q OUTPUT | L | L | L | L | L | L | L | L | L | L | L | L | L | L | L | L | L | L | L | L | L | L | L | L | L | L | L | L | L | L | L | H | H | H | H | H | H | H | H | H |

FIG. 29(a)

| COUNT | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| A OUTPUT OF COUNTER B101a | L | H | L | H | L | H | L | H | L | H | L | H | L | H | L | H |
| B OUTPUT OF COUNTER B101a | L | L | H | H | L | L | H | H | L | L | H | H | L | L | H | H |
| C OUTPUT OF COUNTER B101a | L | L | L | L | H | H | H | H | L | L | L | L | H | H | H | H |
| D OUTPUT OF COUNTER B101a | L | L | L | L | L | L | L | L | H | H | H | H | H | H | H | H |
| A OUTPUT OF COUNTER B102a | L | L | L | L | L | L | L | L | L | L | L | L | L | L | L | L |
| B OUTPUT OF COUNTER B102a | L | L | L | L | L | L | L | L | L | L | L | L | L | L | L | L |
| C OUTPUT OF COUNTER B102a | L | L | L | L | L | L | L | L | L | L | L | L | L | L | L | L |
| D OUTPUT OF COUNTER B102a | L | L | L | L | L | L | L | L | L | L | L | L | L | L | L | L |
| OUTPUT OF NAND ELEMENT M104a | H | H | H | H | H | H | H | H | H | H | H | H | H | H | H | H |
| D INPUT OF DECODER G101a | H | L | H | L | H | L | H | L | H | L | H | L | H | L | H | L |
| 0 OUTPUT OF DECODER G101a | H | L | H | H | H | H | H | H | H | H | H | H | H | H | H | H |
| 1 OUTPUT OF DECODER G101a | H | H | H | L | H | H | H | H | H | H | H | H | H | H | H | H |
| 2 OUTPUT OF DECODER G101a | H | H | H | H | H | L | H | H | H | H | H | H | H | H | H | H |
| 3 OUTPUT OF DECODER G101a | H | H | H | H | H | H | H | L | H | H | H | H | H | H | H | H |
| 4 OUTPUT OF DECODER G101a | H | H | H | H | H | H | H | H | H | L | H | H | H | H | H | H |
| 5 OUTPUT OF DECODER G101a | H | H | H | H | H | H | H | H | H | H | H | L | H | H | H | H |
| 6 OUTPUT OF DECODER G101a | H | H | H | H | H | H | H | H | H | H | H | H | H | L | H | H |
| 7 OUTPUT OF DECODER G101a | H | H | H | H | H | H | H | H | H | H | H | H | H | H | H | L |
| 0 OUTPUT OF DECODER G102a | L | L | L | L | L | L | L | L | L | L | L | L | L | L | L | L |
| 1 OUTPUT OF DECODER G102a | H | H | H | H | H | H | H | H | H | H | H | H | H | H | H | H |
| OUTPUT OF NAND ELEMENT M220 | H | H | H | H | H | H | H | H | H | H | H | H | H | H | H | H |
| OUTPUT OF NAND ELEMENT M221 | L | L | L | L | L | L | L | L | L | L | L | L | L | L | L | L |

FIG. 29(b)

| | 16 17 18 19 20 21 22 23 24 25 26 27 28 29 30 31 | 32 33 34 35 36 37 38 39 40 41 42 43 44 45 46 47 |
|---|---|---|
| | | 48 ~ 63 |
| | | 64 ~ 79 |
| | | 80 ~ 95 |
| | | 96 ~ 111 |
| | | 112 ~ 127 |
| | | 128 ~ 143 |
| | | 144 ~ 159 |
| | | 160 ~ 175 |
| | | 176 ~ 191 |
| | | 192 ~ 207 |
| | | 208 ~ 223 |
| | | 224 ~ 239 |
| | | 240 ~ 255 |
| | L H L H L H L H L H L H L H L H | L H L H L H L H L H L H L H L H |
| | L L H H L L H H L L H H L L H H | L L H H L L H H L L H H L L H H |
| | L L L L H H H H L L L L H H H H | L L L L H H H H L L L L H H H H |
| | L L L L L L L L H H H H H H H H | L L L L L L L L H H H H H H H H |
| | H H H H H H H H H H H H H H H H | |
| | L L L L L L L L L L L L L L L L | |
| | L L L L L L L L L L L L L L L L | |
| | L L L L L L L L L L L L L L L L | |
| | L L L L L L L L L L L L L L L L | L L L L L L L L L L L L L L L L |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | H H H H H H H H H H H H H H H H | H H H H H H H H H H H H H H H H |
| | L L L L L L L L L L L L L L L L | H H H H H H H H H H H H H H H H |
| | H H H H H H H H H H H H H H H H | L L L L L L L L L L L L L L L L |
| | L L L L L L L L L L L L L L L L | H H H H H H H H H H H H H H H H |

FIG. 32

| INPUT | | | | OUTPUT | | | | | | | | | | INPUT | | | | OUTPUT | | | | | | | | | |
|---|---|---|---|---|---|---|---|---|---|---|---|---|---|---|---|---|---|---|---|---|---|---|---|---|---|---|---|
| D | C | B | A | 0 | 1 | 2 | 3 | 4 | 5 | 6 | 7 | 8 | 9 | D | C | B | A | 0 | 1 | 2 | 3 | 4 | 5 | 6 | 7 | 8 | 9 |
| L | L | L | L | L | H | H | H | H | H | H | H | H | H | L | L | L | H | H | H | H | H | H | H | H | H | L | H |
| L | L | L | H | H | L | H | H | H | H | H | H | H | H | L | L | L | H | H | H | H | H | H | H | H | H | H | L |
| L | L | H | L | H | H | L | H | H | H | H | H | H | H | L | H | L | H | H | H | H | H | H | H | H | H | H | H |
| L | L | H | H | H | H | H | L | H | H | H | H | H | H | L | H | H | H | H | H | H | H | H | H | H | H | H | H |
| L | H | L | L | H | H | H | H | L | H | H | H | H | H | H | L | L | L | H | H | H | H | H | H | H | H | H | H |
| L | H | L | H | H | H | H | H | H | L | H | H | H | H | H | L | H | H | H | H | H | H | H | H | H | H | H | H |
| L | H | H | L | H | H | H | H | H | H | L | H | H | H | H | H | L | H | H | H | H | H | H | H | H | H | H | H |
| L | H | H | H | H | H | H | H | H | H | H | L | H | H | H | H | H | H | H | H | H | H | H | H | H | H | H | H |

FIG. 33

| COUNT | | 0 | 1 | 2 | 3 | 4 | 5 | 6 | 7 | 8 | 9 |
|---|---|---|---|---|---|---|---|---|---|---|---|
| OUTPUT | D | L | L | L | L | L | L | L | L | H | H |
| | C | L | L | L | L | H | H | H | H | L | L |
| | B | L | L | H | H | L | L | H | H | L | L |
| | A | L | H | L | H | L | H | L | H | L | H |

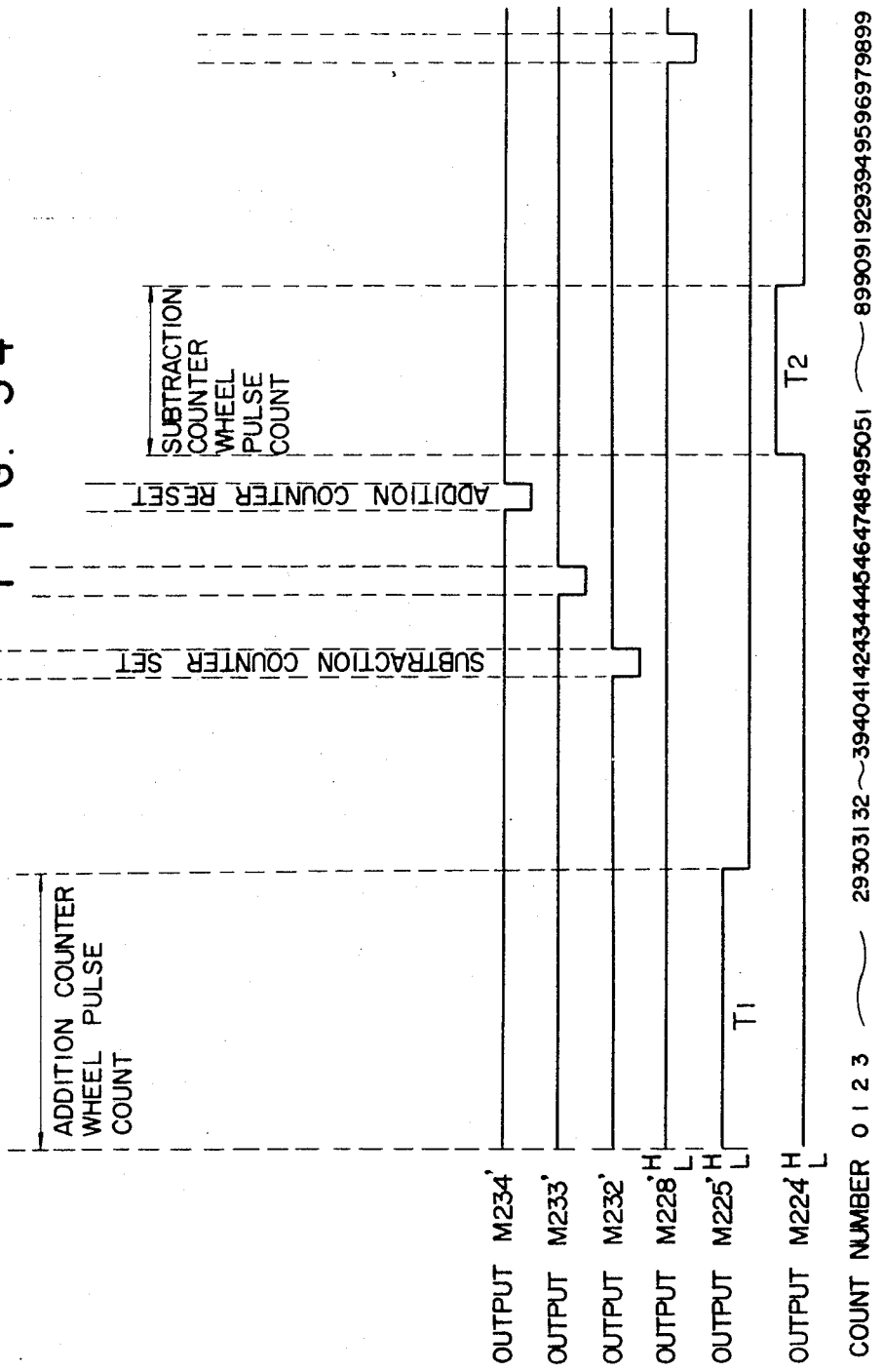

DIGITAL-TYPE BRAKE-CONTROL METHOD AND SYSTEM

BACKGROUND

This invention relates generally to wheeled vehicles, brake systems thereof, and electromechanical control systems. More particularly, the invention relates to a new and advanced method and system of digital type for brake control wherein control operation from detecting signals corresponding to the distance run by a wheel, through processing of the detected signals with a computer, to controlling accordingly a part to be controlled is accomplished through the consistent use of digital signals without conversion of the detected signals involved into analog signals.

In most of the various electrical anti-skid systems used heretofore, a computer for determining the state of rotation of wheels is composed principally of analog circuits. For this reason, the operation method of these systems has comprised detecting the rotational state of the vehicle wheels by converting the rotational state into pulse signals (digital signals) by means of a sensor, smoothing these digital signals and converting the same into analog signals, processing these analog signals by means of a computer, and thereby generating ON and OFF signals (digital signals) and imparting the same to an actuator for controlling the braking torque on the wheels.

In an analog circuit, furthermore, variations in the characteristics of the organizational elements thereof have an effect on the performance of the computer. Accordingly, there is the disadvantageous necessity of having to use a temperature-compensation circuit as a countermeasure for temperature drift due to temperature dependency of these elements, circuits for converting digital signals into analog signals, and high-precision constant-voltage circuits.

At the same time, since the characteristics of the elements used vary with the passage of time, deleterious effects are imparted to the computer performance, and because of deviations or irregularities in the characteristics of the elements produced, the respective performances of individual computers differ, whereby circuits of this character are unsuitable for quantity (mass) production.

It is well known, furthermore, that the use of integrated circuits affords miniaturization of circuits, great economy, and increase in reliability. However, the adoption of integrated circuits for analog circuits has not been possible in a practical manner because of reasons such as the necessity of using inductances and capacitors of high capacitance in the circuit. Consequently, there have been many difficulties such as the necessity of specifying the deviations of passive elements such as elements R and C constituting the circuit much more strictly than in the case of adopting for digited circuits integrated circuits for digited circuits.

SUMMARY

It is an object of this invention to provide a method and system of digital type for brake control control wherein a computer for determining the rotational state of wheels is composed of digital circuits for distinguishing high and low, that is, I and 0, of input signals, whereby the adoption of integrated circuits is facilitated, the organization is simplified, and the operation is made reliable and accurate, and moreover, the system may be easily applied or separated depending on the various purposes of use.

Another object of the invention is to provide a digital-type brake-control system wherein addition and subtraction of a number of pulses proportional to distance run by a wheel counted for a specific time from any given time instant and a number of pulses proportional to distance run by the wheel counted for a specific time from a time instant different from the first time instant are carried out simultaneously.

Still another object of the invention is to provide a digital-type brake-control system where the sensing level is automatically varied in accordance with the magnitude of the wheel speed so that the optimum braking is effected irrespective of the vehicle speed at which braking is applied.

A further object of the invention is to provide a digital-type brake-control system provided with a conversion circuit which is capable of accomplishing ample control with a single addition-subtraction circuit even in the case where sensors are respectively installed at a plurality of wheels to be controlled, and which, moreover, adds the signals from the plurality of sensors to amplify the same.

According to this invention in one aspect thereof, briefly summarized, there is provided a digital-type brake-control method for controlling a hydraulic brake system in a vehicle, which method comprises: detecting the rotational state of at least one wheel of the vehicle to produce a measurand output; converting said output into a pulse signal; comparing and determining the difference between the number of pulses of this pulse signal counted from any first instant for a specific period and that counted from a time instant other than the first instant for a specific period; determining whether this difference is greater or less than a predetermined reference pulse number; and accordingly producing a pressure variation signal thereby to vary the hydraulic pressure in the brake system.

According to this invention in another aspect thereof, there is provided a digital-type brake control system for practicing the above described method, which system comprises: sensor means for detecting the wheel rotational state and producing the measurand output; a computer circuit comprising a conversion circuit for converting the measurand output into wheel pulses, an addition-subtraction circuit for determining the difference between the counted number of pulses, AND circuits for sending the wheel pulses to the addition-subtraction circuit, a comparison circuit for comparing the counted pulses with the predetermined number of pulses thereby to produce the pressure variation signal, and a power amplifier for amplifying the pressure variation signal; and an actuator for varying the hydraulic pressure in the brake system in accordance with the pressure variation signal thus amplified.

The nature, utility, and further features of this invention will be apparent from the following detailed description of preferred embodiments of the invention when read in conjunction with the accompanying drawings, in which like parts are designated by like reference numerals and characters.

DRAWINGS

In the drawings:

FIG. 12 is a chart indicating the operations of the free-running counter and the control decoder in the system shown in FIG. 1;

FIG. 13 is a graphical representation indicating the operations of an addition counter, a subtraction counter, and a register;

FIG. 14 is a chart similar to FIG. 12 indicating the operations of a free-running counter and a control decoder;

FIG. 15 is a similar chart indicating the operations of a register circuit and a comparison decoder;

FIG. 16 is a graphical representation similar to FIG. 13 indicating the operations of an addition counter, a subtraction counter, and a register;

Figure 1:
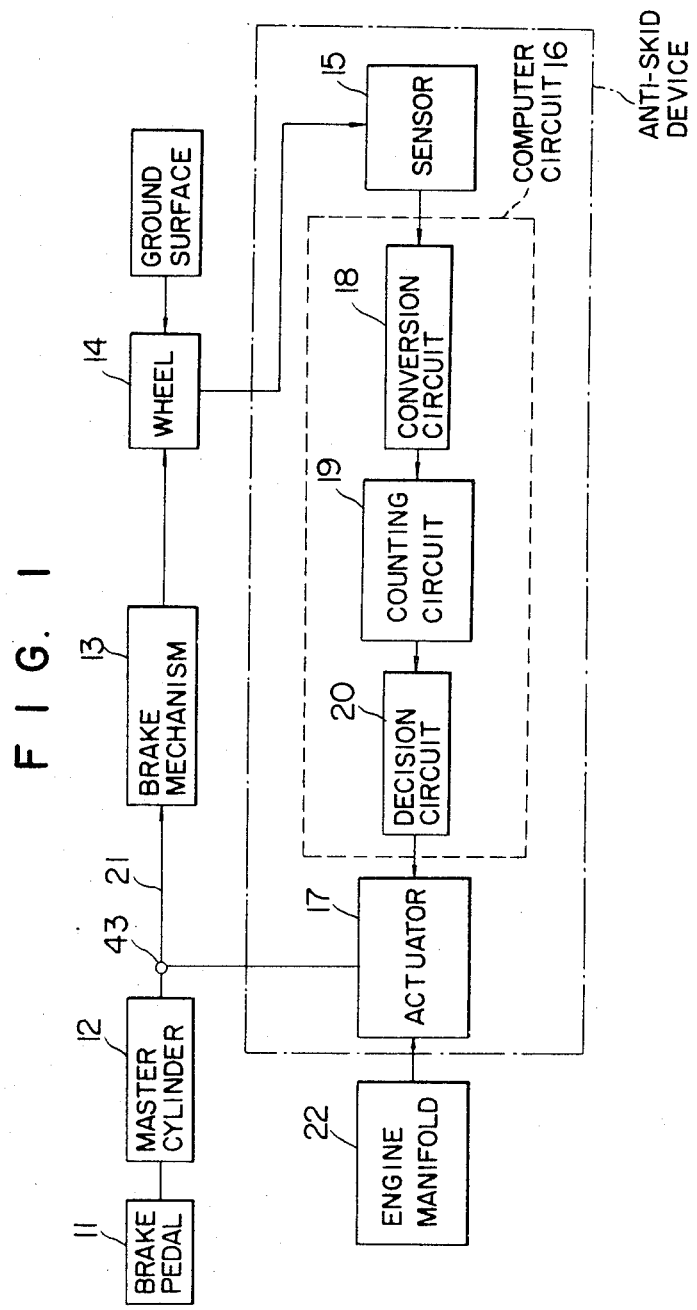
FIG. 1 is a block diagram indicating the essential organization of one specific example of a brake-control system according to this invention.
Figure 2:
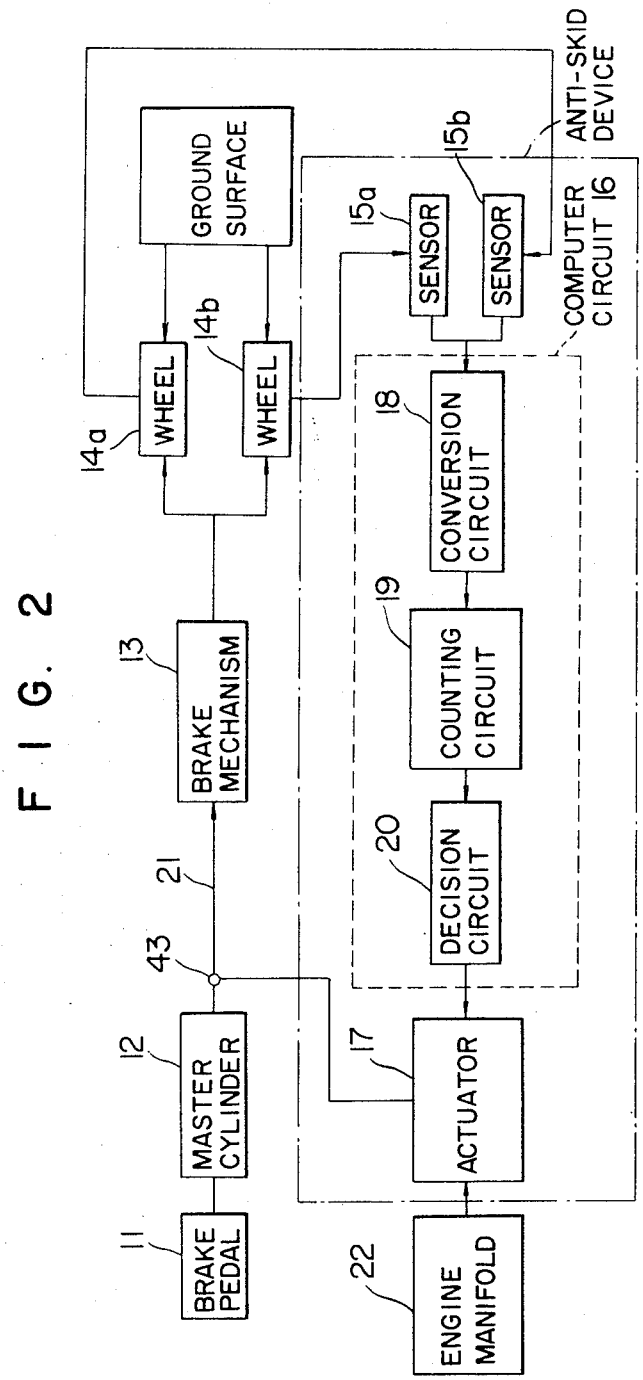
FIG. 2 is a block diagram similar to FIG. 1 showing a modification wherein a plurality of sensors are used.
Figure 3:
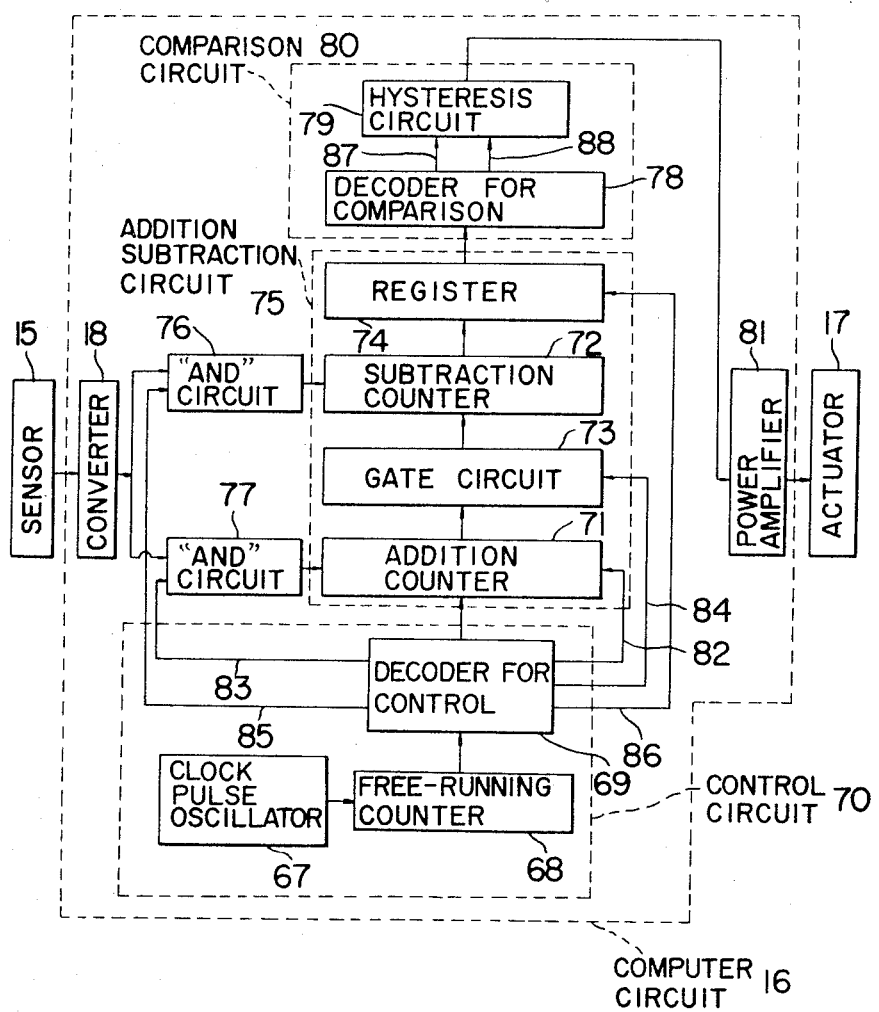
FIG. 3 is a block diagram showing in greater detail the organization of the computer in the system shown in FIG. 1.
Figure 4:
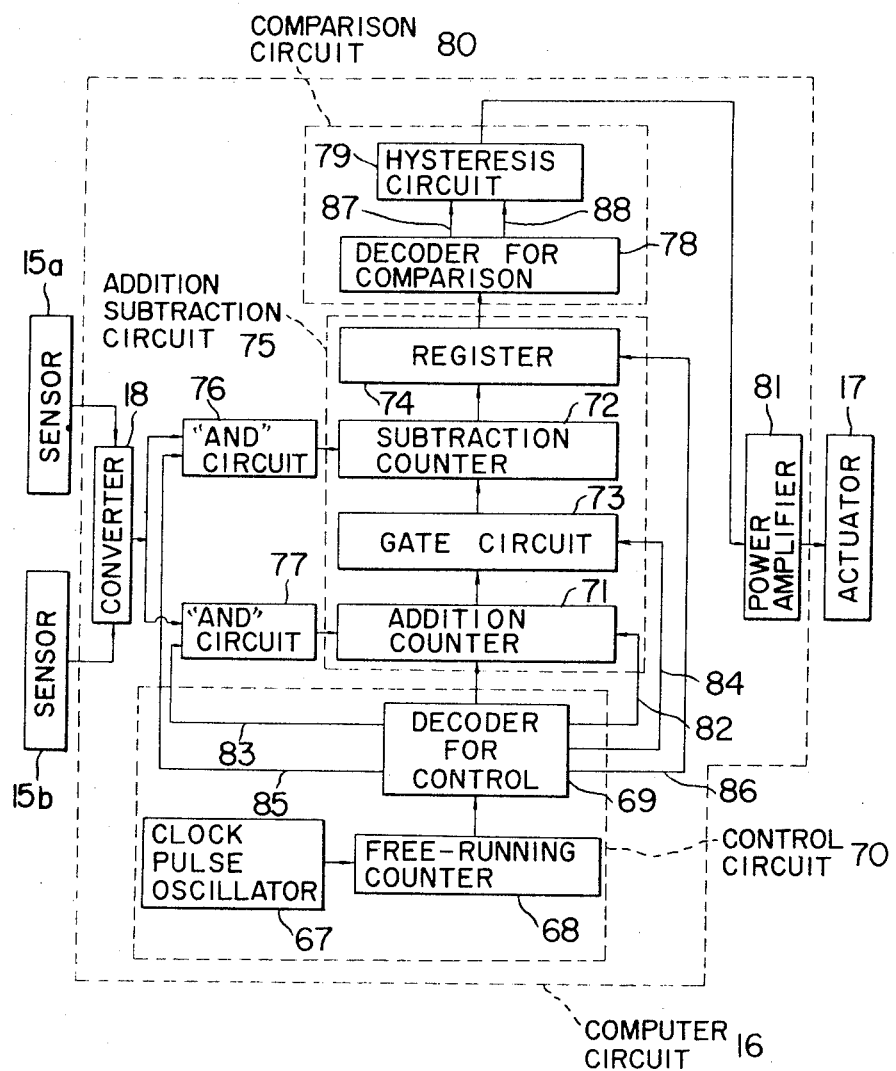
FIG. 4 is a block diagram, similar to FIG. 3, showing in greater detail the organization of the computer in the modified system shown in FIG. 2.
Figure 22:
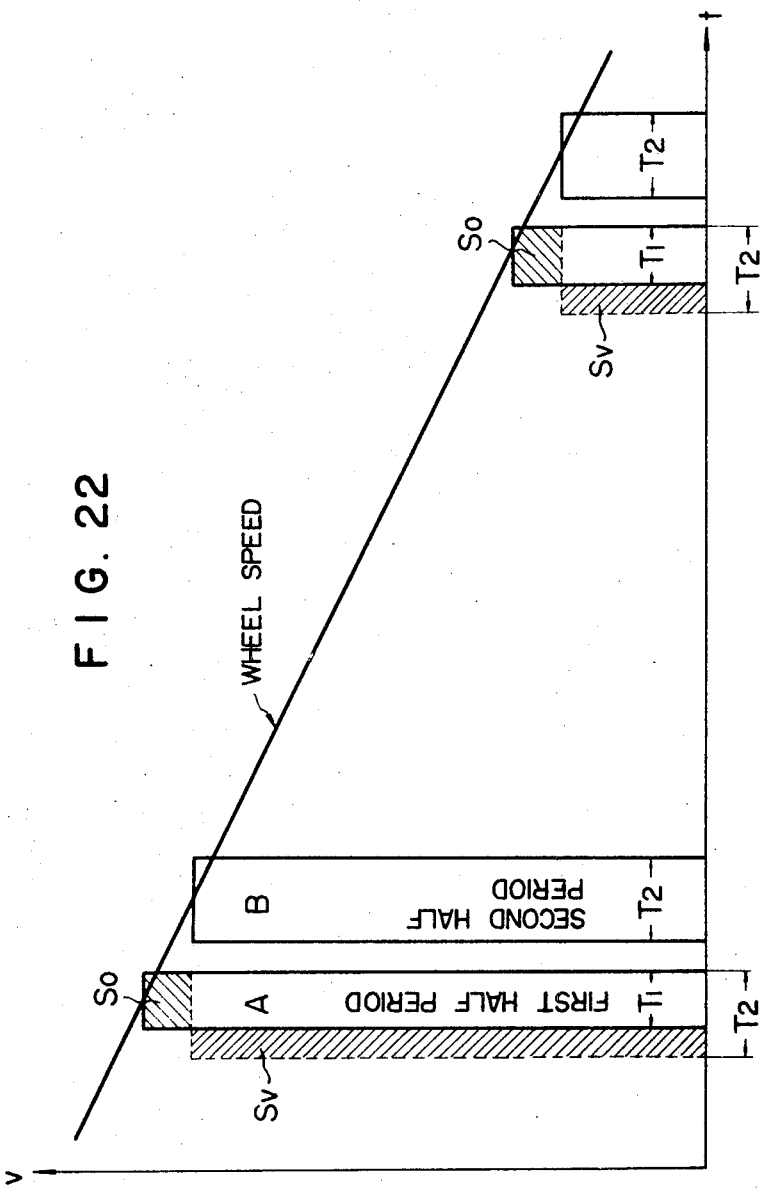
Figure 23:
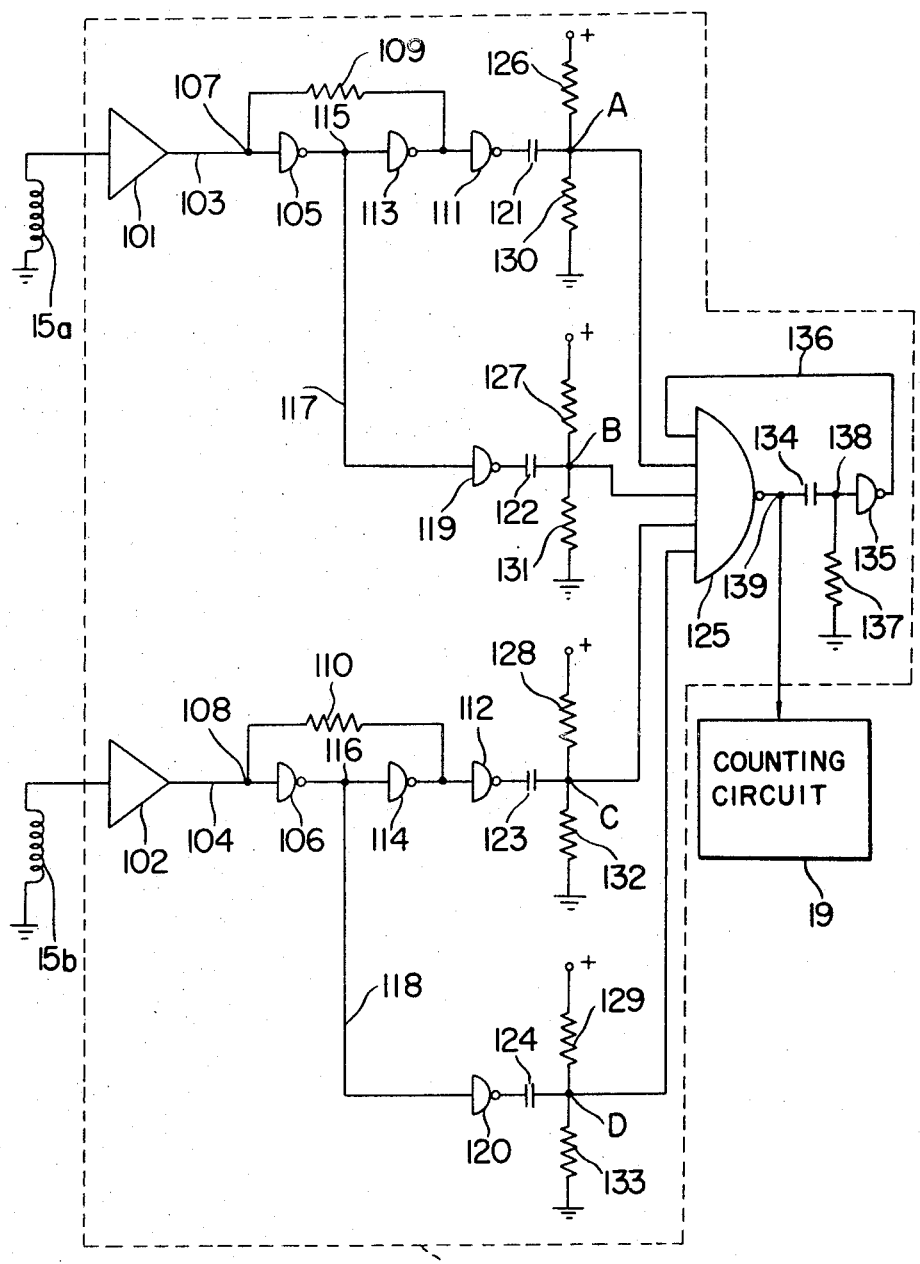
Figure 24:
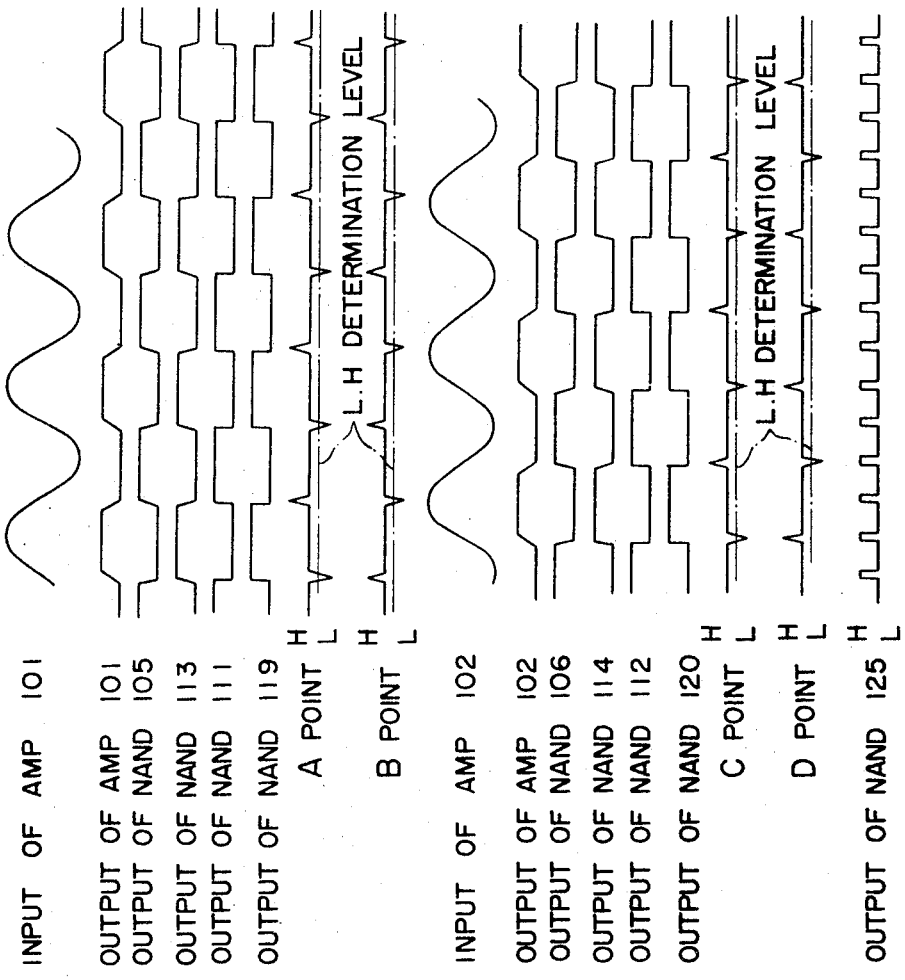
Figure 25:
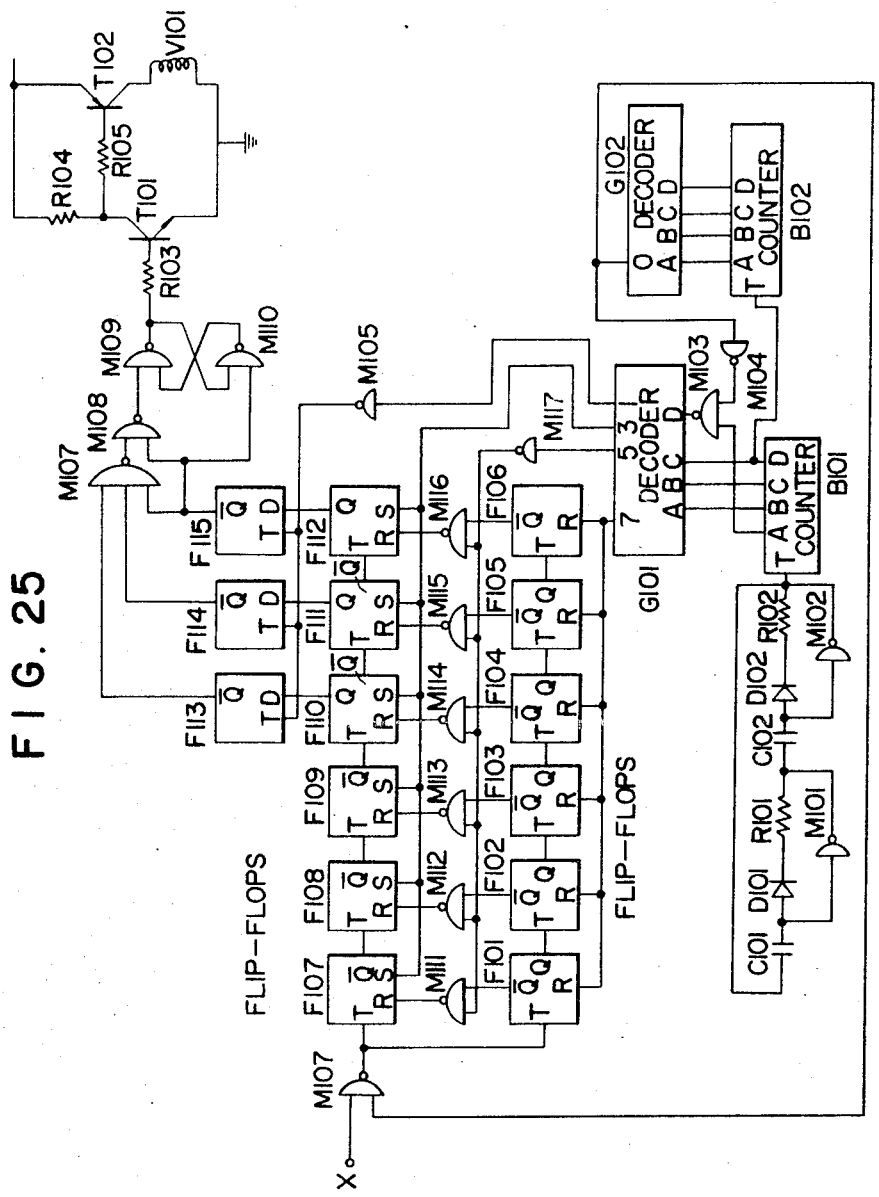
Figure 28:
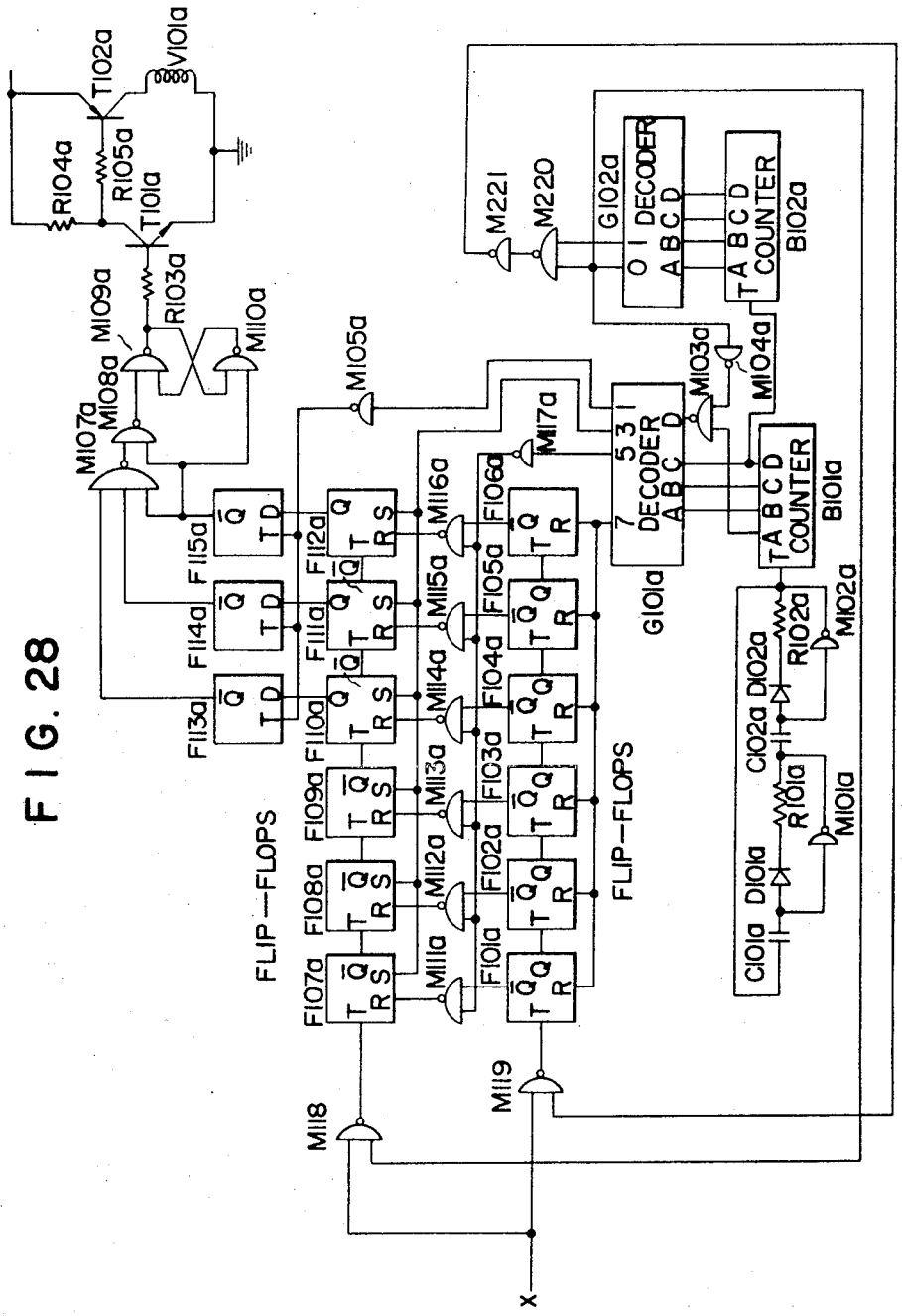
Figure 30:
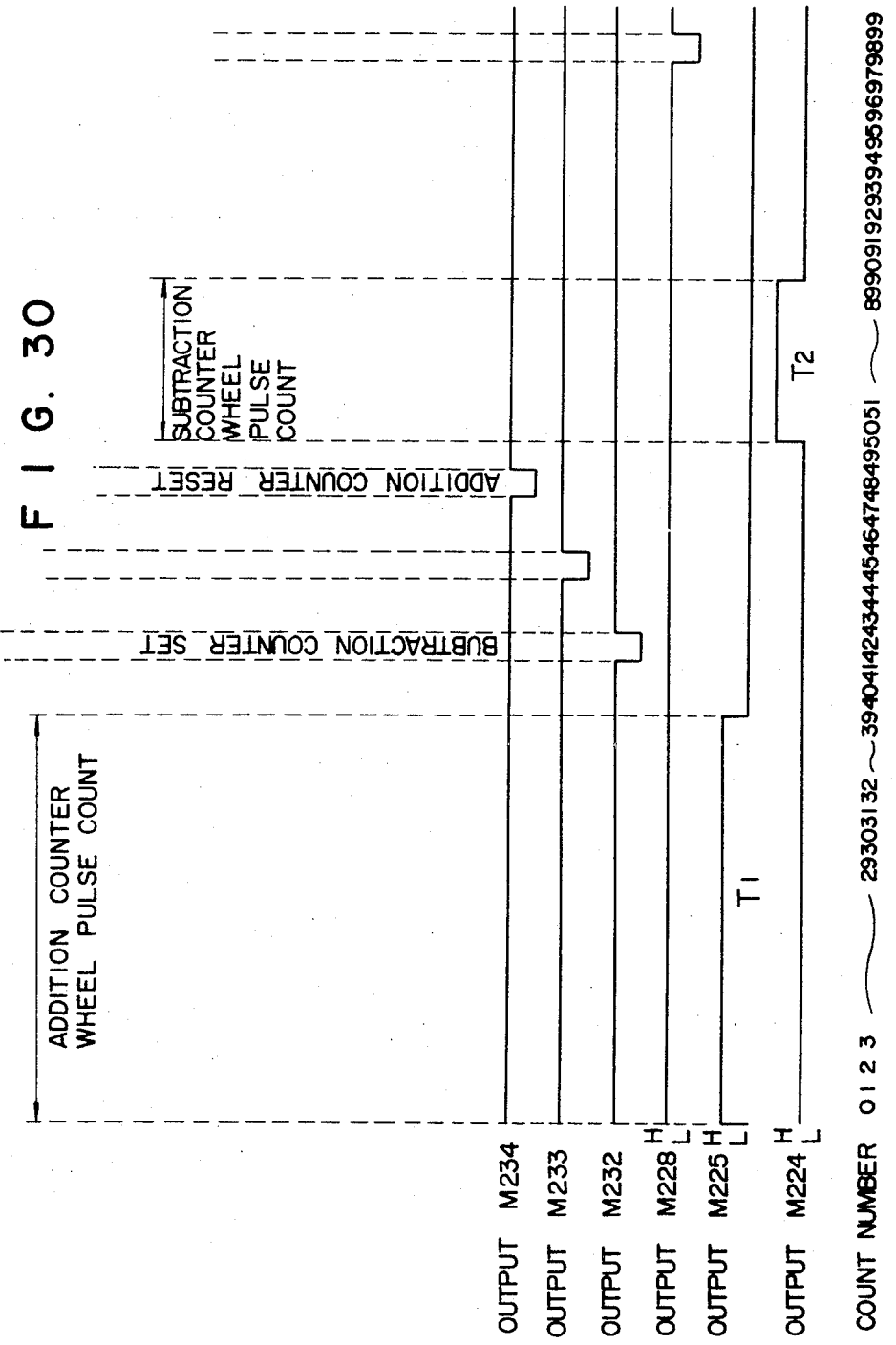
Figure 31:
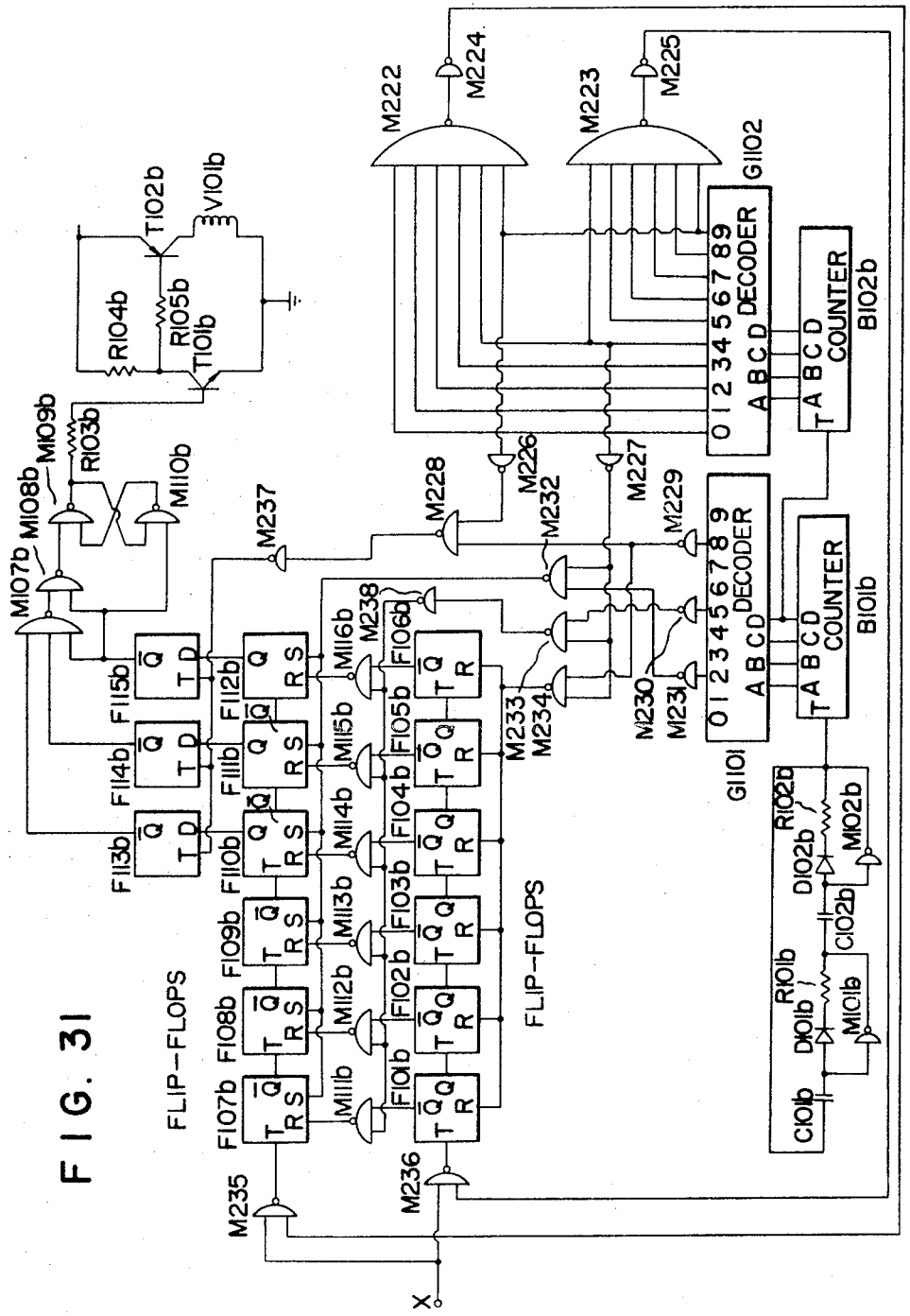
Figure 35:
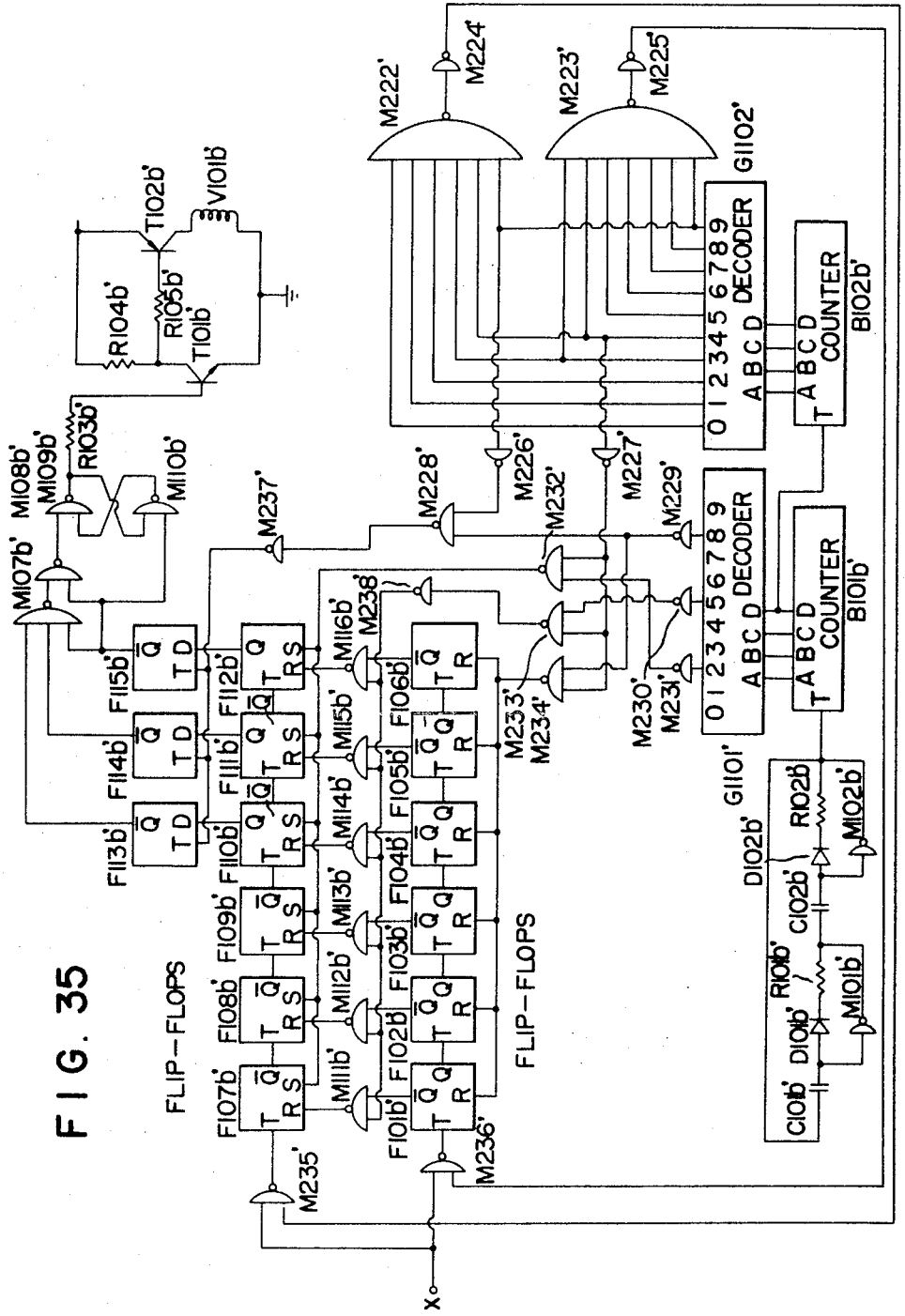

FIGS. 17(a) and 18(a) are a graphical representation and a chat indicating a mode of operation of the computer shown in FIGS. 2 and 4;

FIGS. 17(b) and 18(b) are a graphical representation and a chart indicating a mode of operation of the computer shown in FIGS. 1 and 3;

FIG. 19 is a block diagram showing in detail another example of modification of the computer circuit wherein a reversible counter is used;

FIG. 20 is a graphical representation indicating variations of vehicle speed and wheel speed with time in the case of a known control system;

FIG. 21 is a similar graphical representation indicating the variations of vehicle speed and wheel speed with time in the case of the control system according to this invention;

FIG. 22 is a graphical representation indicating a feature of the operation of the control system of the invention;

FIG. 23 is a circuit diagram showing an example of organization of the conversion circuit of the system shown in FIG. 2;

FIG. 24 is a pulse time chart indicating the operations of various components in the conversion circuit shown in FIG. 23;

FIG. 25 is a circuit diagram showing a further example of embodiment of the invention;

FIG. 26 is a table explanatory of the operation of the example of FIG. 25;

FIG. 27 is a combined graphic and tabular representation explanatory of the operation of the example of FIG. 25;

FIG. 28 is a circuit diagram showing a further example of embodiment of the invention;

FIGS. 29(a) and 29(b) are operational tables explanatory of the operation of the example of FIG. 28;

FIG. 30 is a schematic view showing a further embodiment of the invention;

FIG. 31 is a circuit diagram showing the organization of the example of FIG. 30;

FIG. 32 is a table explanatory of the operation of the example of FIG. 30;

FIG. 33 also is a table explanatory of the operation of the example of FIG. 30;

FIG. 34 is a graph explanatory of the operation of a further example of embodiment of the invention; and FIG. 35 is a circuit diagram showing the organization of the example of FIG. 34.

DETAILED DESCRIPTION

Referring first to FIG. 1, the example of the control system according to the invention has an organization as shown and has the following operational features. When the brake pedal 11 is depressed, hydraulic (brake fluid) pressure is generated by the master cylinder 12 and transmitted through a commonly known brake mechanism 13 to apply a braking hydraulic pressure to a wheel 14 of a motor vehicle.

The wheel 14 is provided with a sensor 15 for detecting the rotational state of the wheel. When the wheel 14 locks or is about to lock, the sensor 15 detects this state of the wheel and transmits a signal, which is processed in a computer circuit 16 to apply an actuating signal to an actuator 17.

The computer circuit 16 comprises, essentially, a conversion circuit 18 for converting the signal from the sensor 15 into pulses, a counting circuit 19 for calculating the difference between the number of pulses counted from a certain first time instant for a specific time period and the number of pulses counted from a second time instant different from the first time instant for a specific time period, and a decision circuit 20 for comparing the magnitude of the difference thus obtained between the numbers of pulses and a predetermined number of pulses and producing accordingly a pressure-reducing signal or a pressure-increasing signal.

The aforementioned actuator 17 is installed at an intermediate point in a pipe line 21 connecting the master cylinder 12 and the brake mechanism 13 and is connected to the intake manifold 22 of the vehicle engine (not shown). A cut-off valve 43 is provided between the master cylinder 12 and the actuator 17 and operates in response to the aforementioned pressure-reducing signal producing by the computer 16 to cut off the fluid communication between the master cylinder 12 and the brake mechanism 13. When the pressure-reducing signal continues to be produced by the computer circuit 16 after the operation of the cut-off valve 43, the fluid circuit volume between the cut-off valve 43 and the brake mechanism 13 is increased, and the hydraulic pressure is reduced.

Figure 10:
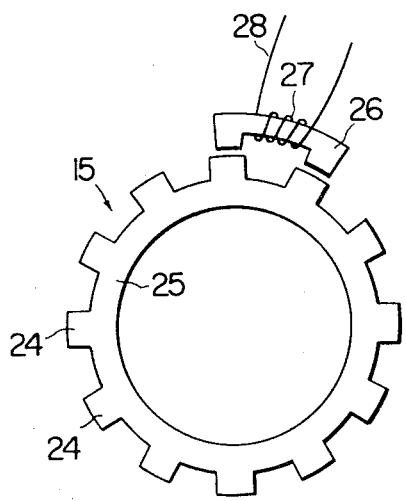
FIG. 10 is a diagrammatic view showing the essential parts of one example of a sensor suitable for use in the system illustrated in FIG. 1.

One specific example of the aforementioned sensor 15 as shown diagrammatically in FIG. 10, has a cog ring 25 having a plurality of teeth 24, around is outer periphery, the ring 25 being adapted to rotate in response to the rotation of the wheel, being fixed to a moving part such as the rear-axle shaft or the propeller shaft of the vehicle. The sensor 15 also has a magnetic 28 mounted on a fixed part of the vehicle in a position to confront the teeth 24 on the outer periphery of the ring 25. The magnetic reluctance of this magnet 26 varies with the rotation of the ring 25. A coil 27 provided with leads 28 is wound around the magnet 26. Variations in the magnetic reluctance due to the rotation of the ring 25 are sensed and led out as signals by the leads 28.

Figure 11:
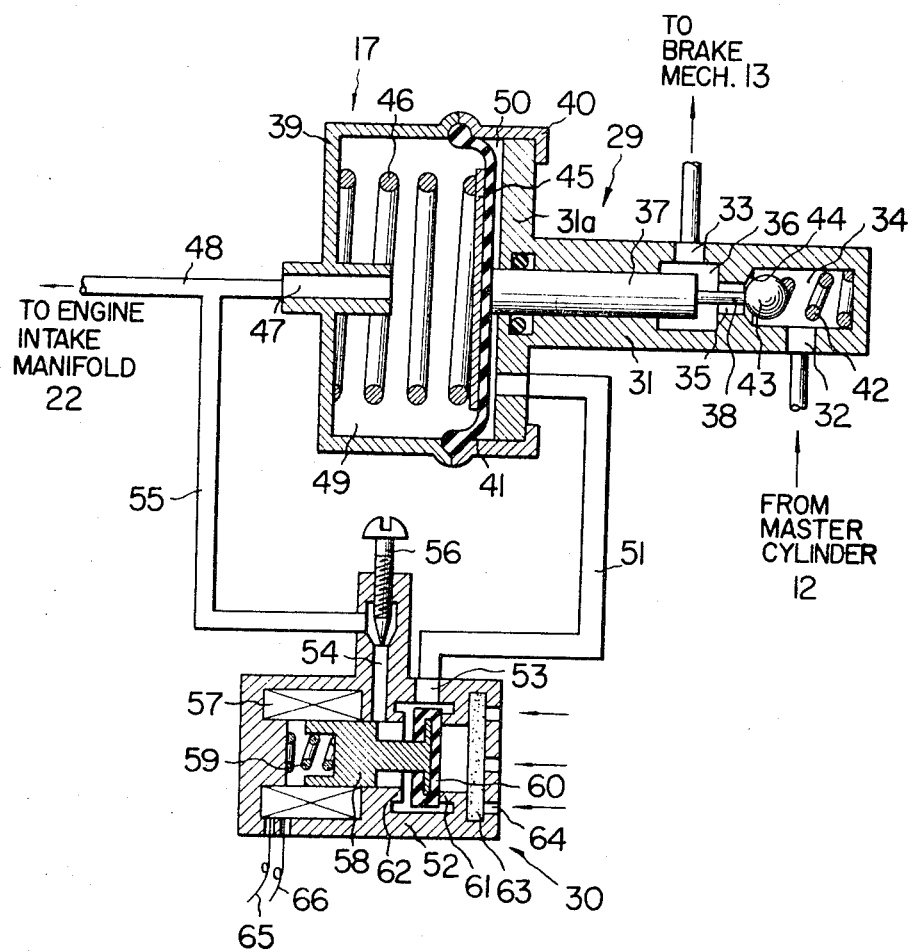
FIG. 11 is a longitudinal section showing one specific example of an actuator suitable for use in the system of FIG. 1.

One specific example of the aforementioned actuator 17, as shown in FIG. 11, comprises a pressure-reducing device 29 and a switching valve 30. The pressure-reducing device 29 has a hydraulic cylinder 31 provided with ports 32 and 33 communicating with the master cylinder 12 and the brake mechanism 13, respectively. The port 32 communicates with a ball-valve chamber 34 formed within the cylinder 31 at one end thereof, while the port 33 communicates with a head chamber 36 also formed within the cylinder 31 coaxially alined with the chamber 34 and communicating therewith by way of a passageway 35. A valve seat 44 is formed at the junction of the passageway 35 and the ball-valve chamber 34 and is adapted to receive a ball valve 43 (the aforementioned cut-off valve) disposed within the chamber 34 and urged toward the valve seat 44 by a compression spring 42.

The cylinder 31 is also provided with a plunger 37 fitted slidably and coaxially therewithin and having at its head end a coaxially projecting ram pin 38 of relatively small diameter. The outer end (right end as viewed in FIG. 11) of this pin is adapted to abut against the ball valve 43 and to push it away from the valve seat 44 to open the valve opening when the plunger 37 retracts (toward the right as viewed in FIG. 11).

The other end (left end as viewed in FIG. 11) of the plunger 37 is connected to the central part of a diaphragm 41 having an outer periphery clamped between and held by the joint between parts 39 and 40 of a diaphragm housing. A spring retainer 45 is fixed to the diaphragm 41 on the side thereof opposite the plunger 37 and retains one end of a return compression spring 46, the outer end of which abuts against the end wall of the housing part 39. The spring 46 is thus disposed in a chamber 49 formed between the diaphragm 41 and the housing part 39. Another chamber 50 is formed between the diaphragm 41 and a flanged part 31a of the cylinder 31, which flanged part is fixed at its peripheral part to the housing part 40.

The housing part 39 is provided at its central part with a passageway 47, which is communicatively connected at its outer end by a pipe line 48 to the aforementioned engine intake manifold 22 and at its inner end to the chamber 49. The pipe line 48 is communicatively connected also by way of a pipe line 55 to a passageway 54 in the aforementioned switching valve 30.

The chamber 50 on one side of the diaphragm 41 is communicated by a pipe line 51 to another passageway 53 in the housing 52 of the switching valve 30.

Between the passageway 54 and the pipe line 55, there is provided an adjusting screw 56 screw-engaged with a part of the valve housing 52 and having a conical inner end by which the flowrate of the fluid flowing through the line 55 and passageway 54 can be adjusted.

The switching valve 30 is provided within a part of its housing 52 with an enclosed solenoid coil 57 encompassing a plunger 58 slidably and coaxially disposed therein and urged in one axial direction (toward the right as viewed in FIG. 11) by a compression spring 59 disposed between the plunger and the valve housing 52. The plunger 58 supports, at its right end remote from the spring 59, a disk-shaped valve 60 fixed coaxially thereto and pressed by the force of the spring 59 against a valve seat 61 of annular shape formed by a part of the valve housing 52.

The valve seat 61 is coaxially and symmetrically opposed by another annular valve seat 62 spaced apart from the valve seat 61 by a distance such that the disk valve 60, interposed there between with ample clearance, will be separated from one valve seat when it is seated on the other. The spaces and passageways around the valve 60 and valve seats 61 and 62 are so formed that when the valve 60 is seated on the valve seat 61, the forementioned passageway 53 is communicated with passageway 54, and when the valve 60 is seated on the opposite valve seat 62, the passageway 53 is communicated with ports 64 formed in the outer wall of the valve housing 52 and opened to the outside atmosphere. An air filter or cleaner 63 is provided to filter air flowing into the valve housing from the outside through the ports 64.

The electromagnetic solenoid coil 57 is provided with leads 65 and 66, which are connected to the output side of the aforementioned computer circuit 16.

The actuator 17 of the above described organization operates in the following manner. During normal braking, i.e., braking of the kind wherein wheel locking does not occur, increased hydraulic pressure from the master cylinder 12 is transmitted through passageway 32, chamber 36, and passageway 33 to brake mechanism 13 thereby to effect normal braking.

During this operation, pressure-reducing device 29 and switching valve 30 are both in the inoperative state as indicated in FIG. 11. More specifically, electromagnetic solenoid coil 57 of switching valve 30 is de-energized, whereby plunger 58 is being forced by the force of spring 59 toward the valve seat 61, and valve 60 is pressed against and seated on valve seat 61. Consequently, the inflow of atmospheric air is completely cut off, and the negative pressure or vacuum produced in the engine intake manifold 22 is being introduced through line 48 and passageway 47 to chamber 49 and, at the same time, is being introduced through line 55, passageways 54 and 53, and line 51 to chamber 50.

Therefore, the air pressures acting on the opposite sides of diaphragm 41 are equal. That is, there is no pressure difference acting on diaphragm 41, which is thereby pressed by the force of spring 46 toward ball-valve chamber 34 and held at the farthest point of its stroke in that direction. As a result, ball valve 43 is separated from its valve seat 44 by pin 38 of plunger 37.

When, as a result of sudden braking, the wheel is in a locked state or is about to be locked, a corresponding signal from sensor 15 is transmitted by way of computer 16 to energize solenoid coil 57 of switching valve 30, whereby plunger 58 is pulled against the force of spring 59. Consequently, valve 60 is separated from valve seat 61 and pressed against valve seat 62, thereby cutting off communication between the engine intake manifold 22 and chamber 50, and atmospheric pressure is introduced into chamber 50 through ports 64, air cleaner 63, passageway 53, and line 51.

As a result, a difference in the air pressures acting on the opposite sides of diaphragm 41 is produced and forces diaphragm 41 against the force of spring 46 toward the left as viewed in FIG. 11, thereby permitting spring 42 to press ball valve 43 against its valve seat 44. Consequently, communication of brake fluid pressure between the master cylinder 12 and brake mechanism 13 (i.e., wheel cylinder) is cut off.

Thereafter, when the pressure-reducing signal continues to be sent further from computer circuit 16, solenoid coil 57 continues to be energized, and atmospheric pressure is transmitted through ports 64 to chamber 50, whereby plunger 37 is moved farther away from ball-valve chamber 34. Consequently, the fluid volume within head chamber 36 increases, and the hydraulic pressure within the fluid circuit to the brake mechanism 13 decreases. As a result, wheel 14, which was locked or was about to lock, regains its driving power and begins to accelerate.

Then, since the reaction of the ground surface overcomes the braking force due to the hydraulic pressure thus reduced, the pressure-reducing signal from the computer diminishes, and, inversely, a pressure-increasing signal is transmitted. Solenoid 57 thereupon assumes its de-energized state, whereby the mechanisms of the actuator as shown in FIG. 11 return to their respective normal states as indicated. Accordingly, communication between the master cylinder 12 and brake mechanism 13 is restored, and braking torque is applied to the wheel. The above described operation is repeated until the vehicle stops.

By rotationally adjusting the adjusting screw 56, the rate of increase of pressure transmitted to the brake mechanism (i.e., wheel cylinder) can be regulated as desired. Furthermore, by running the vehicle on a low-$\mu$ ground surface of minimum coefficient of friction between the wheel tire and the ground surface, applying braking torque to the wheel, and adjustably rotating the adjusting screw 56 until the wheel does not lock, effective braking performance can be obtained on any ground surface from low- $\mu$ surfaces to high- $\mu$ surfaces.

The aforementioned computer circuit 16 will be described in greater detail with respect to a specific example of organization thereof as indicated in FIG. 3. The major circuit sections of this computer circuit are a conversion circuit 18, a control circuit 70, an addition-subtraction circuit 75, AND circuits 76 and 77, a comparison circuit 80, and a power amplifying circuit 81.

The conversion circuit 18 operates to amplify and waveshape the output signal of the sensor 15 and thereby to generate a wheel pulse signal. The control circuit 70 comprises a clock-pulse oscillater 67, a free-running counter oscillator and a decoder 69 for control and operates to form a control signal from clock pulses. The addition-subtraction circuit 75 comprises an addition counter 71, a subtraction counter 72 or a reversible counter, a gate circuit 73, and a register circuit 74 and operates to determine, in accordance with the above mentioned control signal, the difference between the number of pulses obtained by counting the wheel pulse signal for a specific time period from a certain first time instant and the number of pulses obtained by counting for a specific time from a certain second time instant differing from the first time instant.

The AND circuits 76 and 77 operate to transmit the wheel pulse signal to the addition subtraction circuit 75 in accordance with the command of the control signal. The comparison circuit 80 comprises a decoder circuit 78 for comparison and a hysteresis circuit 79 and operates to compare the difference between the numbers of pulses obtained in the addition circuit 75 and a predetermined number of pulses and thereby to produce a pressure-reducing signal or a pressure-increasing signal. The power amplifier circuit 81 operates to amplify the power of the pressure-reducing and pressure-increasing signals.

The computer circuit of the organization described above and illustrated in FIG. 3 operates as follows. The rotational state of the wheel 14 is detected by sensor 15, the resulting output signal of which is converted by converter 18 into a number of pulses proportional to the distance of travel of the wheel.

On one hand, clock-pulse oscillator 67 continually generates a signal of a constant frequency. Free-running counter 68, receiving this signal, repeats the operation of counting the frequency of clock-pulse oscillator 67 from zero and, when the number reaches the maximum countable by free-running counter 68, automatically returning to zero or continuing to count. The results of counting of this free-running counter 68 are successively to decoder 69 for control, which operates in accordance with the output of free-running counter 68 to transmit periodically a reset signal 82, an addition signal 83, a gate signal 84, a subtraction signal 85, and a set signal 86. The interrelation between these signals is indicated in FIG. 12.

First, addition counter 71 is reset by reset signal 82. Then AND circuit 77 is opened by addition signal 83, and the wheel pulse signal from the conversion circuit 18 is subjected to addition by addition counter 71. Upon completion of this addition, gate circuit 73 is opened by gate signal 84, and the addition result obtained by addition counter 71 is set in subtraction counter 72.

Next, AND circuit 76 is opened by subtraction signal 85, and the wheel pulse signal from conversion circuit 18 is subjected to subtraction by subtraction counter 72. Upon completion of this subtraction, as a result of addition as indicated in FIG. 13, the difference $\delta_0$ of the numbers of pulses obtained is determined in subtraction counter 72. The preceding difference between the numbers of pulse is designated by $\delta_1$.

The above mentioned difference between the numbers of pulses is set in register circuit 74 by set signal 86. Register circuit 74 is made up, for example, of 10 flip-flops (FF) and maintains the result of counting with addition counter 71 and subtraction counter 72 in one of the states indicated in FIG. 15. For example, when the states of flip-flop FF 10 through FF 1 corresponding to a decimal output (difference between numbers of pulses) of −3 are, respectively, 1 1 1 1 1 1 1 0 1, a pressure increase start signal 87 is transmitted by decoder circuit 78 for comparison. When the states of flip-flops FF 10 through FF 1 corresponding to a decimal output of +9 are, respectively, 0 0 0 0 0 1 0 0 1, a pressure reduction signal 88 is transmitted.

Hysteresis circuit 79, which is made up of similar flip-flops, operates when pressure increase start signal 87 from comparison decoder circuit 78 is applied to continue transmitting the pressure increase signal until the succeeding pressure reduction start signal 88 is applied. When the pressure reduction start signal 88 is applied, hysteresis circuit 79 continues to transmit the pressure reduction signal until the succeeding pressure increase start signal 87 is applied. This pressure reduction signal or pressure increase signal thus transmitted is amplified by power amplifier circuit 81 and sent to actuator 17.

The operation of the addition counter 71 and the subtraction counter 72 will now be described more fully with reference to FIGS. 12 and 13.

Clock pulse oscillator 67 within control circuit 70 in the instant example is adapted to send out a reset signal 82 at the time of transmission No. 0, a gate signal 84 at the time of the 16th transmission, and a set signal 86 at the time of the 31st transmission. The free-running counter 68 is made up, for example, of five flip-flops. The first-stage flip-flop (FF1) repeats ON (1) OFF (0) operation, while the second-stage flip-flop (FF2) switches over from OFF (0) to ON (1) when FF1 switches from ON (1) to OFF(0) and sustains this switched over state until the succeeding switching over from ON(1) to OFF (0) of FF 1. Then, when FF 1 switches over from ON (1) to OFF (0), FF 2 this time switches over from ON (1) to OFF (0). Similarly, when a flip-flop of a preceding stage switches over from ON to OFF, the flip-flop of the succeeding stage switches over (from ON to OFF or from OFF to ON). These operational states can be represented as in FIG. 12.

In the instant example of this invention, the clock-pulse oscillator 67 is so adapted that one cyle (i.e., signals 0 to 31) thereof is repeated in approximately 0.05 second (50 milliseconds). Then, when the 31st clock-pulse transmission is completed, and the operation returns to zero, a reset signal 82 is transmitted simultaneously by control decoder 69, and then an addition signal 83 for opening AND circuit 77 is transmitted. This signal is transmitted in a manner such that, for example, the case wherein the clock pulses are other than No. zero and the 15th, and flip-flop FF5 is OFF (0) is detected by decoder 69.

In this manner, counting of the wheel pulse signal resulting from the detecting by sensor 15 and conversion by conversion circuit 18 is started by addition counter 71. This counting method is graphically indicated in FIG. 5, wherein a certain time period is divided into suitable divisional periods of equal length, and each divisional period is further divided into a first half period and a second half period.

Figure 5:
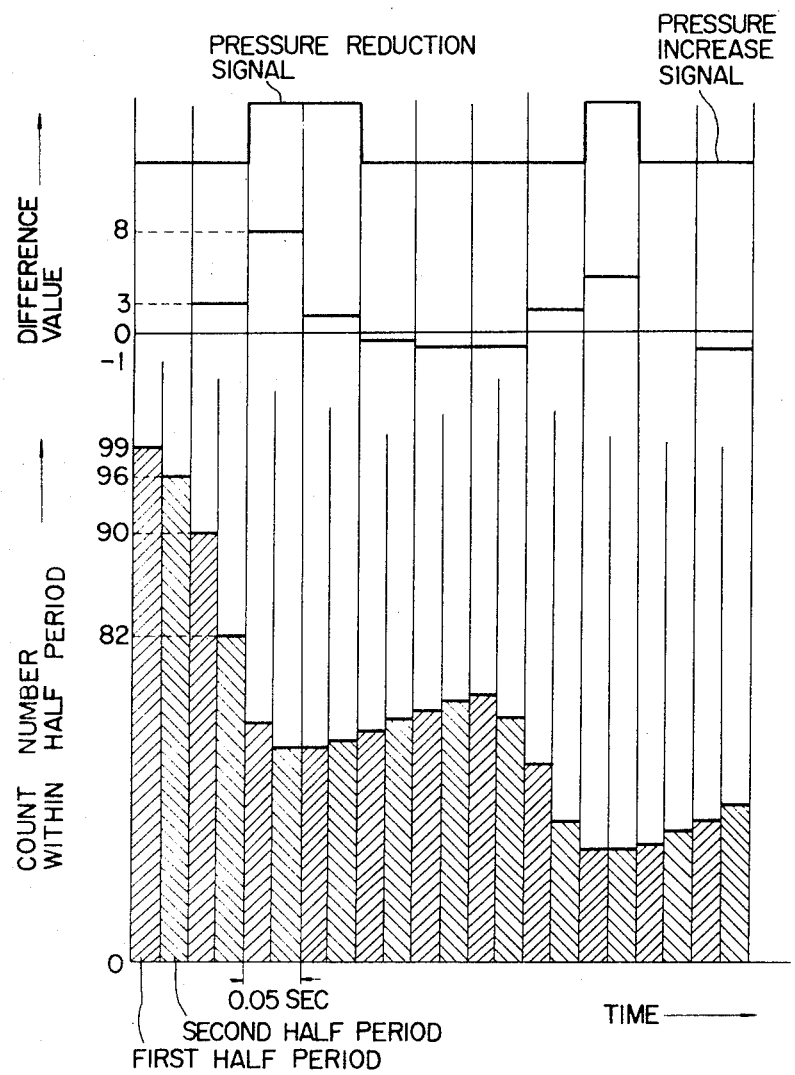
FIG. 5 is a graphical representation in the form of a time chart for a description of a mode of operation of counting numbers of pulses.

Addition circuit 75 within computer circuit 16 is continually calculating the difference between the pulse count of the first half period and the pulse count of the second half period within the same divisional period. When the vehicle is running in a normal state, this difference between the pulse counts of the first half and second half periods is zero. Then, when braking is applied, the distance of travel per unit time of the wheel decreases, and the number of pulses entering addition counter 71 decreases with time as indicated in FIG. 5 and 13.

More specifically, when AND circuit 77 assumes its open state, addition counter 71 immediately starts counting, as indicated by line A in FIG. 13. When the 15th clock pulse is introduced, that is, when a time period of 25 milliseconds thereof has elapsed, a signal for closing AND circuit 77 is transmitted from control decoder 69, and the counter value thereof is 99, for example. When AND circuit 77 closes, addition counter 71 stores (memorizes) the value 99 counted in the first half period until set signal 86 is sent.

In the instant example, when the clock pluse becomes the 16th, gate signal 84 is produced by control decoder 69, and gate circuit 73 opens, the pulse number 99 counter by addition counter 71 being set in subtraction counter 72. Then, when the clock pulse becomes the 17th. AND circuit 76 opens, and subtraction operation is started from the counted value 99 as indicated by line B in FIG. 13.

When the 30th clock pusle is transmitted, AND circuit 76 is closed by control decoder 69. With the 31st clock pulse, set signal 86 is produced, and the pulse number counted by subtraction counter 72 is set in register circuit 74. With clock pulse No. zero of the succeeding cycle, the pulse number counted by addition counter 71 is cleared.

When AND circuit 76 becomes closed, the difference between the numbers of pulses of the first half and second half periods becomes $\delta_o$, that is, 3 in the example. In FIG. 13, the parts of the register signal (dot-dash chain line) and the subtraction signal (broken line) which overlap are intentionally shown in offset state since understanding of the description would become difficult if these parts were to be shown in superimposed state. In this manner, the reset signal of control circuit 70 is produced, and the wheel pulse signal is subjected to addition and subtraction operation before clock-pulse oscillator 67 produces the 31st signal, the difference between these pulses being counted. Thereafter, the above described operation is repeated.

As a result, when the pulse difference exceeds a predetermined value (eight pulses in the instant example), a pressure-reducing signal (as indicated in FIG. 5) is produced. This presssre-reducing signal is amplified by power amplifier circuit 81 and energizes electromagnetic solenoid coil 57 installed within switching valve 30 of actuator 17. Consequently, as described hereinbefore, the braking torque is reduced, and the difference between the pulse counts of the first half period and second half period within a certain divisional period becomes small until, eventually, this difference becomes negative, and a pressure-increasing signal, (as indicated in FIG. 5) is produced. When this pressure-increasing signal is produced, solenoid coil 57 within switching valve 30 of actuator 17 is de-energized, whereby the various parts of actuator 17 are placed in their inoperative states as indicated in FIG. 11.

Figure 9:
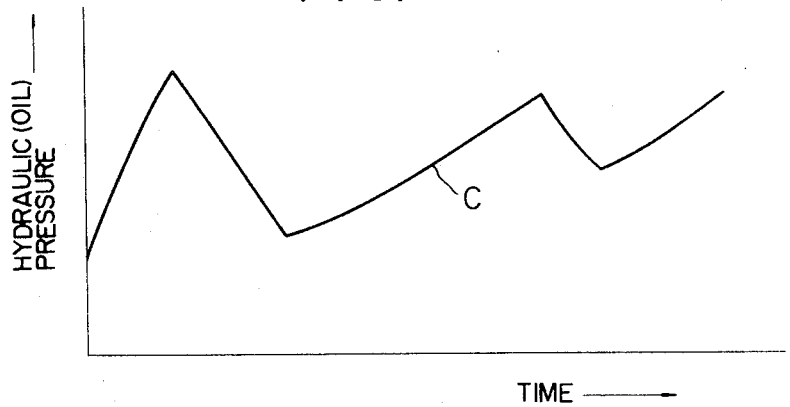
FIG. 9 is a graphical representation indicating the variation of brake hydraulic pressure with time during a braking operation.

As a result, the aforementioned brake hydraulic pressure again acts on the wheel and causes the wheel to operate in the locking direction, as indicated by line C in FIG. 9. Thereafter, when the decrease in the pulse signal from the wheel becomes a value of an order such that a pressure-reducing signal issues from comparison circuit 80, the above described operation is, of course, repeated.

The method of obtaining a pressure increase start signal or a pressure reduction start signal in the register circuit 80 and hysteresis circuit 78 will now be described with reference to FIG. 15. While the output from register circuit 74 is actually a binary output, it may be considered in terms of a decimal output, in which case, states from −512 to +511 are produced as output, and a pressure increase start signal is transmitted when one state from among states −1 through −512 is produced as output from register circuit 80. With the condition that the output of flip-flop FF 10 in register circuit 74 is 1, it is possible to include all of the states −1 through −512. Therefore, when the condition that the output of flip-flop FF 10 is 1 is satisfied, a pressure-increase start signal is produced.

A pressure reduction start signal is produced when one state from among states +8 through +511 issues as output from register circuit 74. By taking the condition that the output of flip-flop FF.10 is zero, the states 0 through +511 can be collectively judged. That a decimal output (i.e., the difference between the first and second half periods of a certain divisional period of a wheel pulse) is of the state of from 0 to +7 can be confirmed by detecting with the AND circuit the fact that flip-flops FF.4 through FF.10 are all zero. The condition of exception of the state wherein the output of flip-flop FF. 10 is zero, and, moreover, the flip-flops FF.4 through FF. 10 are all zero is composed with AND circuits, and when this condition is satisfied, a pressure reduction start signal is produced.

When the decimal output (pulse difference) of the register circuit output is from zero to 7, that is, when the output of each flip-flop corresponds to the range between the range wherein a pressure increase start signal is produced and the range wherein a pressure reduction start signal is produced, the signal is sustained depending on the preceding signal. For example, when the preceding signal has been a pressure increase signal, and the wheel pulse difference falls within 0 through 7 because of variation in the wheel speed, the pressure increase signal is sustained without change; and when the preceding signal has been a pressure reduction signal, and the wheel pulse difference is from 0 to 7, the pressure reduction signal is sustained without change.

In a modification as illustrated in FIG. 19 of the computer circuit used in the system of this invention, the addition and subtraction counters of the preceding example are replaced by a reversible counter 100.

FIGS. 2 and 4 are block diagrams showing an example of modification of the system illustrated in FIG. 1. In this modification, sensors 15a and 15b are provided for detecting the states of rotation of a plurality of wheels, for example, a right wheel 14a and a left wheel 14b. The details of this modified system with be further described with reference to FIGS. 23 and 24. The above mentioned sensors 15a and 15b are connected respectively to the amplifiers 101 and 102 within the conversion circuit 18 shown in FIGS. 2 and 4 and are coupled through conductors 103 and 104 to NAND elements 105 and 106. At the same time, these sensors are coupled through branch points 107 and 108 of the conductors 103 and 104 and through resistances 109 and 110 to NAND elements 111 and 112.

The above mentioned amplifiers 101 and 102 may comprise operational amplifiers, linear ICs, or transistor circuits. The NAND elements 105 and 106 are coupled to the NAND elements 113 and 114 and, moreover, are coupled to NAND elements 119 and 120 through branch points 115 and 116 and conductors 117 and 118. The NAND elements 111, 119, 112, and 120 are connected respectively by way of capacitors 121, 122, 123, and 124 and junctions A, B, C, and D to NAND element 125.

Resistances 126, 127, 128, and 129 are respectively inserted between a power source (not shown) and the junctions A, B, C, and D, while resistances 130, 131, 132, and 133 are inserted respectively between ground (earth) and the junctions A, B, C, and D. Four known differentiation circuits are formed respectively by the capacitor 121 and resistances 126 and 130, the capacitor 122 and resistances 127 and 131, the capacitor 123 and resistances 128 and 132, and the capacitor 124 and resistances 129 and 133.

The above mentioned NAND element 125 is coupled by way of a capacitor 134 to a NAND element 135, which is coupled by way of a conductor 136 to the input side of the NAND element 125. A resistance 137 is inserted between ground (earth) and a branch point 138 between the capacitor 134 and the NAND element 135. The NAND element 125, capacitor 134, NAND element 135, and resistance 137 form a monostable multivibrator of known type. A branch point 139 between the NAND element 125 and the capacitor 134 is connected to the aforementioned counting circuit 19.

The above mentioned NAND elements 105, 106, 111, 112, 113, 114, 119, 120, 125, and 135 are bipolar digital circuits capable of accomplishing NAND operation and, at the same time, amplification operation. For example, a Mitsubishi Molectron M 5310 P is used for the NAND element 125 in the instant embodiment.

The circuit of the above described organization operates as follows. The input of amplifier 101, that is, the output of sensor 15a, is amplified by amplifier 101, whereupon a substantially rectangular waveform as indicated in FIG. 24 is obtained as the output of amplifier 101. This waveform is wave-shaped by a Schmitt circuit formed by resistance 109 and NAND elements 105 and 113, and respectively inverted waveforms are imparted to NAND elements 105 and 113. Further waveshaping is carried out by NAND elements 111 and 119. That is, waveforms of opposite signal levels are obtained at NAND elements 111 and 119.

From the outputs of NAND elements 111 and 119, waveforms as indicated at points A and B in FIG. 24, are obtained from respective differentiation circuits. Similarly, the output of sensor 15b results in waveforms as indicated at points C and D. NAND element 125 receives as inputs the outputs appearing at points A, B, C, and D and, when all of these inputs are of H level, it puts out an output of L level. Furthermore, when one or more of these inputs is or are of L level, an output of H level is produced.

This output of NAND element 125 is shaped into a rectangular waveform of very small pulse width by the above mentioned monostable multivibrator circuit and, passing through branch point 139, is transmitted to counting circuit 19 shown in FIG. 2 or addition circuit 75 shown in FIG. 4. In this manner, the signals generated by sensors 15a and 15b are obtained in blended state.

At vehicle speeds during normal driving, the time constant of each differentiated waveform is much shorter than the time interval during which the differentiated waveform to be the input of NAND element 125 is generated, and the probability of all differentiated waveforms being generated simultaneously (i.e., the probability of superimposition of output pulses) is extremely low, being approximately 0.001 in the worst case in the instant example, whereby it is of a negligible order in practice.

Next, when the control signals of the control decoder 69 are selected to be periodically transmitted in the order indicated in FIG. 18(a), that is, in the sequence of set signal 86, gate signal 84, reset signal 82, and addition and subtraction signals 83 and 85, the pulse count of subtraction counter 72 is first set in resistor circuit 74 by set signal 86 as indicated in FIG. 17(a). The pulse count thus set is stored until set signal 86 of the succeeding cycle is produced.

Next, the pulse count of addition counter 71 at the time is set in subtraction counter 72 by gate signal 84, and addition counter 71 is reset by reset signal 82. Subtraction signal 85 causes subtraction counter 72 to subtract the wheel pulse number generated at that time, while, simultaneously, addition signal 83 causes addition counter 71 to add successively wheel pulses generated by sensor 15 and conversion circuit 18. That is, addition signal 83 and subtraction signal 85 are simultaneously produced, and the wheel pulses formed therebetween cause one to increase addition counter 71 and the other to decrease the subtraction counter 72.

At the time instant when subtraction signal 85 disappears, the value of subtraction counter 72 is the difference produced by subtracting the number of wheel pulses generated in a divisional period succeeding a certain preceding divisional period from the value of the addition counter increased by addition by wheel pulses generated in the preceding divisional period. The counted value of subtraction counter 72 at the instant when the above mentioned subtraction signal 85 disappears is again set in register circuit 74 by set signal 86. That is, the difference $\delta_0$ between the number of wheel pulses generated in a certain divisional period and the number of wheel pulses generated in the succeeding divisional period is stored in register circuit 74, as indicated in FIG. 17(a).

$\delta_1$ denotes the difference between the numbers of pulses of the preceding cycle. The register circuit 74 is made up, for example, of 10 flip-flops, and the result of counting with addition and subtraction counters 71 and 72 is maintained in the state of any one of flip-flops FF.10 through FF.1 indicated in FIG. 15. For example, when the states of flip-flops FF. 10 through FF.1 corresponding to a decimal output (difference between numbers of pulses) of −3 are respectively 1 1 1 1 1 1 1 0 1, a pressure increase start signal 87 is transmitted by comparison decoder 78. When the states of flip-flops FF.10 through FF.1 corresponding to a decimal output of +9 are 0 0 0 0 0 1 0 0 1, a pressure reduction start signal 88 is transmitted as indicated in FIG. 15.

Hysteresis circuit 79, which is made up of similar flip-flops, operates, when pressure increase start signal 87 from comparison decoder circuit 78 is applied thereto, to continue transmitting a pressure increase signal until the succeeding pressure reduction start signal 88 is applied. Then, when this signal 88 is applied, hysteresis circuit 79 continues to transmit a pressure reduction signal until the succeeding pressure increase start signal is applied. This pressure reduction signal or pressure increase signal is amplified by power amplifier circuit 81 and sent to actuator 17.

The operations of the above mentioned addition and subtraction counters 71 and 72 will now be described with reference to FIGS. 17(a) and 18(a). Clock-pulse oscillator 67 of control circuit 70 in the instant example is adapted to transmit a signal to render both AND circuits 76 and 77 closed for signal No. zero, set signal 86 for the first signal, gate signal 84 for the third signal, reset signal 82 for the fifth signal, and a signal to render both AND circuits 76 and 77 opened for the seventh signal.

Free-running counter 68 is made up of, for example, five flip-flops. The flip-flop of the first-state (FF.1) alternately repeats ON(1) and OFF(0). The second-stage flip-flop (FF.2) switches from OFF(0) to ON(1) or from ON(1) to OFF(0) when the first-stage flip-flop switches from ON(1) to OFF(0) and sustains its switched state until the succeeding switching of the first-stage flip-flop from ON(1) to OFF(0). Then, when the first-stage flip-flop switches from ON(1) to OFF(0), the second-stage flip-flop this time switches from ON(1) to OFF(0) or from OFF(0) to ON(1). Similarly, in accordance with switching from ON to OFF of a flip-flop of a preceding stage, the flip-flop of the succeeding stage undergoes inverted operation (from ON to OFF or from OFF to ON). This operational state may be indicated as in FIG. 18(a).

In the instant example, a single cycle (transmission of from 0 to 31) of clock-pulse oscillator 67 is repeated in 0.025 second (25 milliseconds). In this manner, counting of wheel pulses detected by sensor 15 and converted by conversion circuit 18 by addition and subtraction counters 71 and 72 is started. This counting method may be described with reference to FIGS. 6 and 17(a) as follows.

Time is divided into divisional periods of equal intervals equal to the time period (25 milliseconds) of one cycle of clock-pulse oscillator 67. Addition counter 71 and subtraction counter 72 within computer circuit 16 are operated to carry out addition and subtraction simultaneously within the same divisional period, and the difference between their pulse counts is counted. When the vehicle is in a normal running state it is neither accelerating or decelerating, and the pulse count difference, therefore, is zero.

Figure 6:
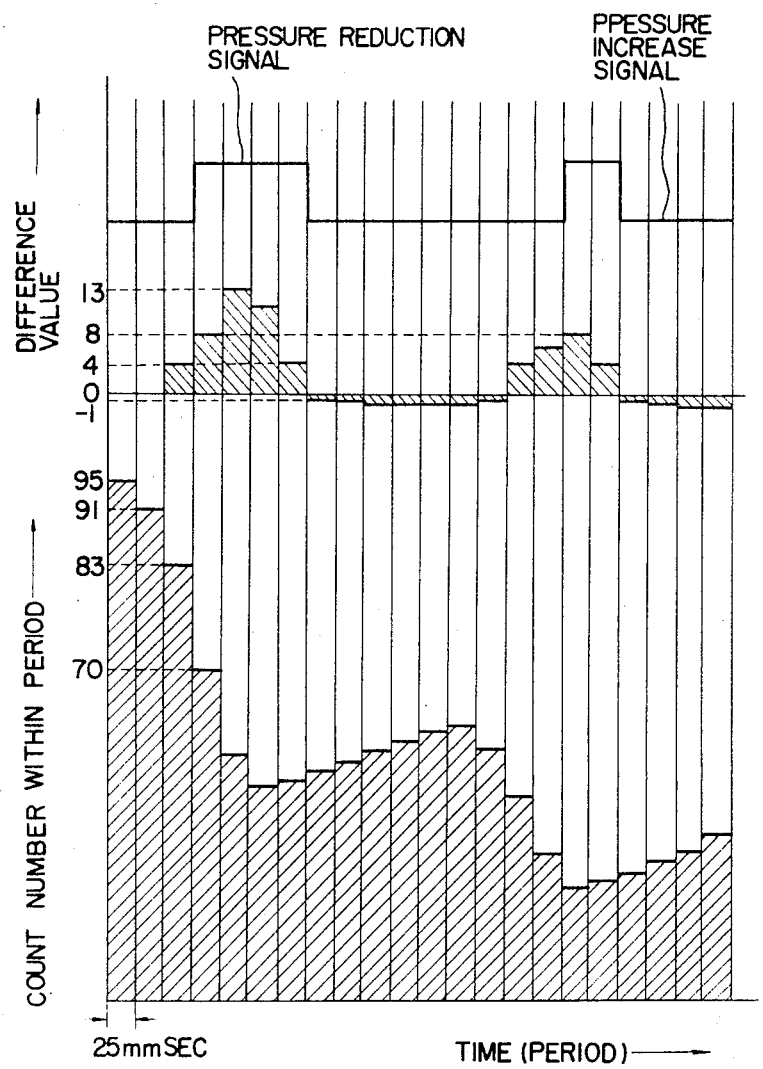
FIG. 6 is a graphical representation similar to FIG. 5 indicating another mode of operation of counting numbers of pulses.

Then, when braking is applied, the distance of travel of the wheels per unit time decreases, and the number of wheel pulses entering addition and subtraction counters 71 and 72 decreases with elapse of time and varies as indicated in FIGS. 6 and 17(a). That is, when both AND circuits 76 and 77 are opened, subtraction counter 72 begins subtraction of the value counted by addition counter 71 in the preceding divisional period, as indicated by line A in FIG. 17(a). At the same time, addition counter 71 begins to count anew the number of wheel pulses from zero, as indicated by line B IN FIG. 17(a).

Then, after completion of the above described addition and subtraction operations, AND circuits 76 and 77 close. Then, when set signal 86 is transmitted, the result of the simultaneous operations in the same divisional period of addition and subtraction counters 71 and 72 is set as difference pulses in register circuit 74.

For example, if the counted value of the addition counter in the preceding divisional period is 95, and that of the instant divisional period is 91, the subtraction counter in the instant divisional period will carry out subtraction one-by-one from the counted value of the preceding divisional period and subtract the counted value 91 of the addition counter of the instant divisional period. Accordingly, the difference (+4) between the pulses is recorded in register circuit 74.

Thereafter, when the pulse difference becomes 8 or more, a pressure reduction start signal as indicated in FIG. 15 is transmitted. In FIG. 17(a), the dot-and-dash line representing the register signal, the intermittent line representing the subtraction signal, and the full line representing the addition signal are intentionally offset from each other at parts thereof where they would otherwise be superposed and be difficult to understand.

The above mentioned pressure reduction start signal is amplified by power amplifier circuit 81 and then energizes electromagnetic solenoid coil 57 installed within switching valve 30 of actuator 17 shown in FIG. 11. Thereupon, as described hereinbefore, the braking torque is reduced, and the above mentioned pulse difference becomes small until, eventually, this difference becomes negative, and a pressure increase signal, as indicated in FIG. 6, is transmitted. When this pressure increase signal is transmitted, solenoid coil 57 within switching valve 30 of actuator 17 is deenergized, whereupon the various parts of actuator 17 assume an inoperative relationship as indicated in FIG. 11.

As a result, the brake fluid acts again on the wheels, as indicated by line C in FIG. 9, to cause the wheels to operate in the locking direction. Thereafter, the decrease in the pulse signal from the wheels becomes of a value such that a pressure reduction start signal is put out from comparison circuit 80, the above described operation is repeated.

Another counting scheme adoptable for the addition counter 71, subtraction counter 72 and register circuit 74 in the aforesaid addition-subtraction circuit 75 will now be described with reference to FIGS. 17(b) and 18(b). While, in the previously described counting scheme of FIGS. 17(a) and 18(a), the addition counter 71 and the subtraction counter 72 operate concurrently, these counters have different periods of operation in this latter scheme. Thus, upon generation of the 31st clock pulse, the AND circuit 77 is closed, and the counting operation of the addition counter 71 is completed. The AND circuit 76 is closed and the counting operation of the subtraction counter 72 is completed upon generation of the clock pulse No. zero. Therefore, the simultaneous counting operation in accordance with the concepts of the present invention is possible if the addition counter 71 and the subtraction counter 72 have different periods of operation as aforesaid.

Further, by presetting the control signals of the control decoder 69 in such a manner that reset signal 82, addition signal 83, gate signal 84, subtraction signal 85 and set signal 86 are generated periodically, as in FIG. 14, the addition counter 71 is first reset by the reset signal 82, followed by the opening of the AND circuit 77 by the addition signal 83, so that the wheel pulse signal from the conversion circuit 18 is added in the addition counter 71 (see FIG. 16). Upon completion of the adding operation, the aforesaid gate circuit 73 is opened by the gate signal 84, so that the result of the adding operation performed in the addition counter 71 is set in the subtraction counter 72.

Succeedingly, the AND circuit 76 is opened by the subtraction signal 85, and the wheel pulse signal from the conversion circuit 18 is subjected to subtracting operation in the subtraction circuit 72. Upon completion of the subtracting operation, pulse difference $\delta_0$, obtained as a result of addition and subtraction as in FIG. 16, is ascertained in the subtraction counter 72. ($\delta_1$ denotes the preceding pulse difference). The mentioned pulse difference is set in the register circuit 74 by set signal 86. This register circuit 74 may be comprised of ten flip-flops F.F., for example, and operates to keep the result of computation of the addition counter 71 and the subtraction counter 72 in either one of the conditions shown in FIG. 15. Hence, if the conditions of the flip-flops F.F. 10 through 1 corresponding to −3 of the decimal output (pulse difference), for example, are respectively 1, 1, 1, 1, 1, 1, 1, 1, 0 and 1, pressure-increase start signal 87 is generated by the decoder circuit 78, as is clear from FIG. 15. It will now be seen that, if the conditions of the flip-flops F.F. 10 through 1 corresponding to +9 of the decimal output are 0, 0, 0, 0, 0, 0, 1, 0, 0 and 1, respectively, pressure-reduction start signal 88 is generated.

The hysteresis circuit 79, made of flip-flops of similar construction, goes on generating a pressure-increasing signal until application of the succeeding pressure-reduction start signal 88 when impressed with the pressure increase-start signal 87 from the decoder circuit 78. When impressed with the pressure-reduction start signal 88, on the other hand, this hysteresis circuit 79 keeps on producing a pressure-reducing signal until application of the succeeding pressure-increase start signal 87. Such pressure-increasing or decreasing signal is transmitted to the actuator 17 after being amplified in the amplifier circuit 81.

The operations of the aforementioned addition counter 71 and subtraction counter 72 are hereinafter described in relation with FIGS. 14 and 16. The clock pulse oscilltor 67 in the control circuit 70 is so made, in this embodiment, as to produce the reset signal 82 at the time of the clock pulse No. zero, the gate signal 84 at the time of the 16th clock pulse, and the set signal 86 at the time of 31st clock pulse. Free-running counter 68 may be made of five flip-flops F.F. 1 through 5. The first-stage flip-flop F.F. 1 is alternately turned ON(1) and OFF(O). The second-stage flip-flop F.F.2 is turned ON (1) or OFF(0) when the first stage flip-flop is turned OFF(0), and the second-stage flip-flop remains in that ON(1) or OFF(0) condition until the first-stage flip-flop is turned OFF (0) the next time. In a similar manner, each of the flip-flops F.F. 3 through 5 is turned ON(1) or OFF(0) only when the flip-flop in the preceding stage is turned OFF(0), as seen in FIG. 14.

Figure 7:
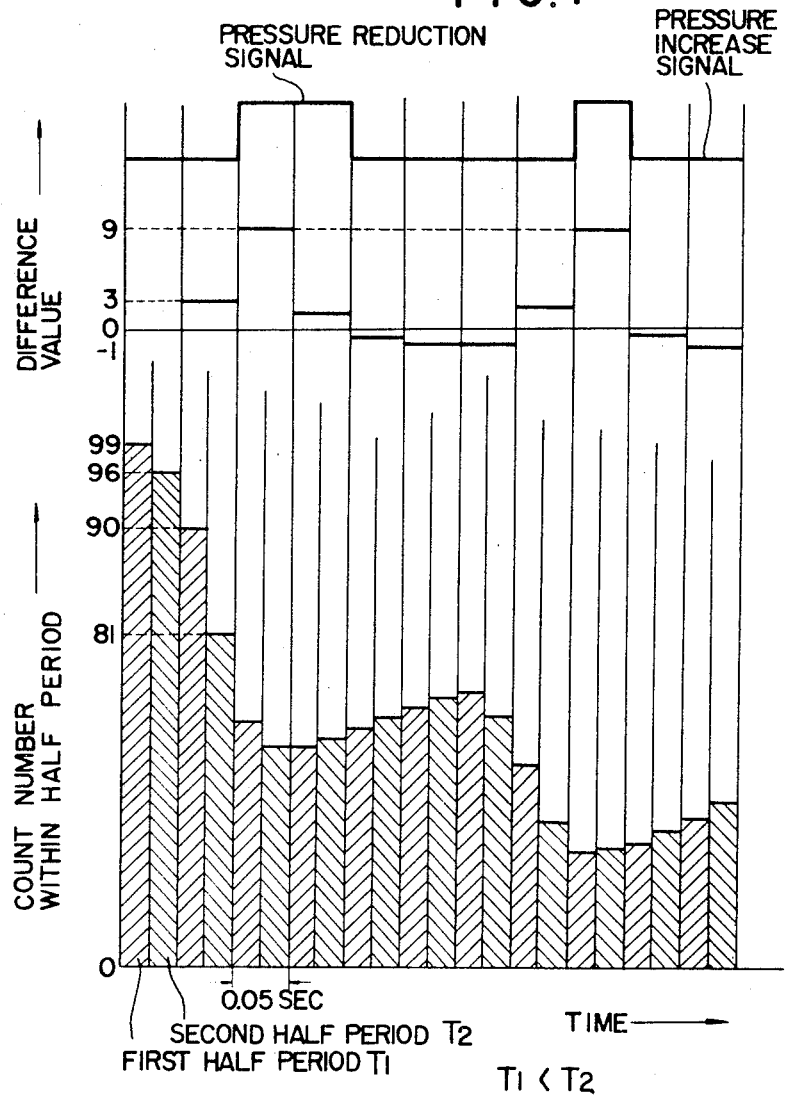
FIG. 7 is a similar graphical representation indicating still another mode of operation of counting numbers of pulses.
Figure 8:
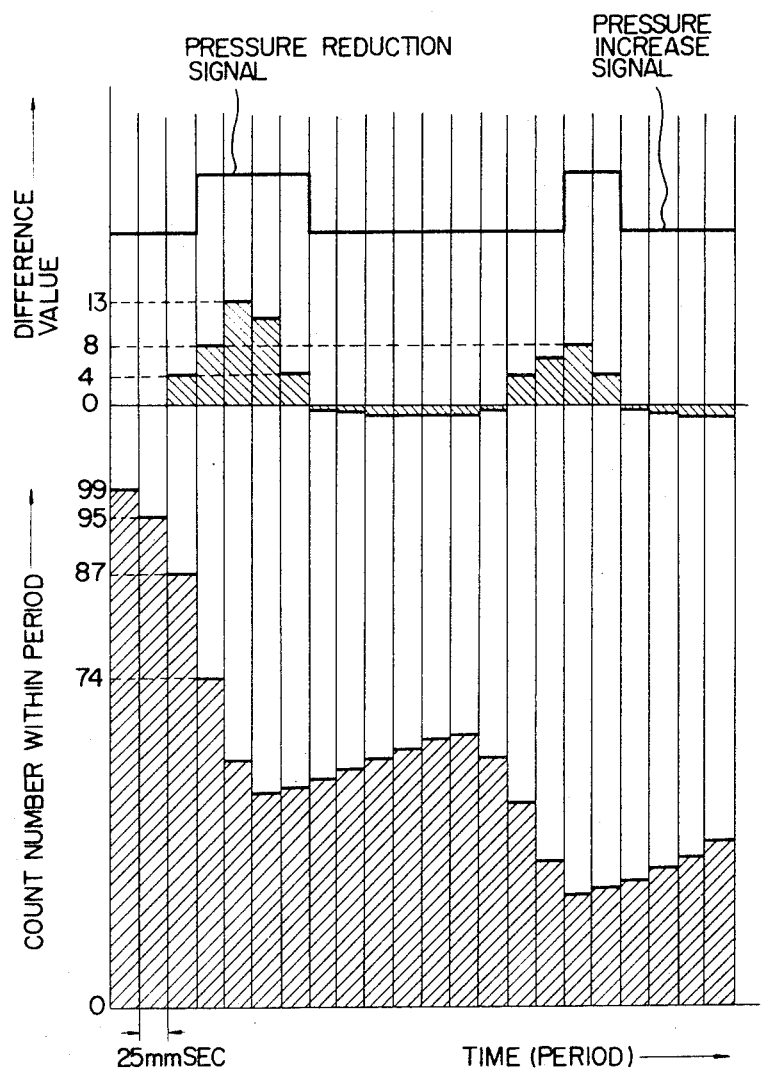
FIG. 8 is a similar graphical representation indicating a mode of operation of counting numbers of pulses.

Inasmuch as the clock pulse oscillator 67 in this embodiment of the invention is so made as to complete its one cycle of operation(the production of the clock pulse No. zero to the 31st clock pulse) in approximately 0.05 seconds (50 mm sec), the reset signal 82 is generated by the control decoder 69 simultaneously with the production of the clock pulse No. zero following that of the 31st clock pulse. The addition signal 83 is succeedingly generated to open the AND circuit 77. This addition signal 83 may be generated so as to be representative of the OFF(0) condition of the fifth-stage flip-flop F.F.5, except when the clock pulse oscillator 67 produces its clock pulse No. zero and 1st and 15th clock pulses. Thus, the counting of the wheel pulse signal, detected by the sensor 15 and converted by the converversion circuit 18, is started in the addition counter 71. As shown in FIG. 7, the method of this counting operation is such that a certain length of time is divided into periods of equal duration, each of the periods being subdivided between first-half period $T_1$ and second-half period $T_2$ of unequal duration ($T_1 < T_2$ in this embodiment of the invention).

The addition-subtraction circuit 75 in the computer circuit 16 always computes a difference between the numbers of pulses in the first and second halves, respectively, of the same period. As is clear from FIG. 22, such pulse number is represented in terms of (wheel speed)·t(time) = distance of vehicle run.

Suppose that the vehicle is braked in this instance. The revolving speed of the wheels per unit length of time is lowered, with the result that the number of pulses fed into the addition counter 71 is decreased with time, as in FIGS. 7 and 16. Thus, when the AND circuit 77 is opened, the addition counter 71 immediately starts counting the pulses (see A, FIG. 16). The signal to close this AND circuit 77 is produced by the control decoder 69 with the 15th clock pulse, that is, upon lapse of $T_1$ seconds. Let the number of pulses counted by the addition counter 71 be 99, by way of example. Upon closure of the AND circuit 77, the addition counter 71 stores the value 99 (which is the number of pulses the counter has counted in the first-half period) until the set signal 86 is generated.

In this embodiment of the invention, the gate signal 84 is produced by the control decoder 69 upon the 16th clock pulse, thereby opening the gate circuit 73, so that the value 99 previously counted by the addition counter 71 is now set in the subtraction counter 72. When the 17th clock pulse, the AND circuit 76 is opened, to initiate subtraction from the mentioned value 99 (see B, FIG. 16). Upon generation of the 30th clock pulse, that is, upon lapse of $T_2$ seconds, the AND circuit 76 is closed by the control decoder 69. The set signal 86 is produced with the 31st clock pulse, and the pulse number counted in the suntraction counter 72 is set in the register circuit 74. The number of pulses counted by the addition counter 71 is cleared with the clock pulse No. zero of the succeeding cycle.

With the closure of the aforesaid AND circuit 76, there is obtained a difference (3 in this embodiment) between the numbers of pulses counted in the first and second halves of the period. In FIG. 16, the overlapping parts of the dot-and-dash line (representing the register signal) and the broken line (representing the subtraction signal) are intentionally offset or shown separately for the purpose of clarity. In this manner, from the production of the reset signal of the control circuit 70 to that of the 31st clock pulse by the clock-pulse oscillator 67, the wheel-pulse signal is added or subtracted as aforesaid, in order to compute the mentioned difference between the pulse numbers. Thereafter a similar procedure is reiterated.

Referring now to FIG. 22 in order to describe the operating features of this invention in greater detail, a difference between the pulse number A counted by the addition counter 71 within an arbitrarily started first-half period $T_1$ and the pulse number B counted by the subtraction counter 72 within an arbitrarily started second-half period $T_2$ is expressed by: $S_o - S_v$. The term $S_o$ represents a constant value irrespective of wheel speed insofar as this wheel speed is being decreased at a constant rate, while the term $S_v$ represents a value in proportion to the product of the approximate wheel speed and a difference between $T_2$ and $T_1$.

Since, in this invention, a certain length of time under consideration is divided into periods of equal duration each of which is subdivided between first and second halves $T_1$ and $T_2$, where $T_1 < T_2$, as previously mentioned, the aforesaid difference ($S_o - S_v$) between the pulse numbers A and B is decreased in substantially inverse proportion to the wheel speed, thereby tending to retard the moment at which the pressure-reducing signal is produced. As best shown in FIG. 15, the pressure-reducing signal is produced when the difference ($S_o - S_v$) exceeds a predetermined value, so that, at the instance of braking action at high speed, the pressure-reducing signal is not generated unless $S_o$ becomes greater. The signal is more readily produced in case of braking action at low speed.

These features of the invention will be more clearly understood from FIGS. 20 and 21. In FIG. 20, which graphically represents variation in vehicle speed, actual wheel speed, and the ideal wheel speed) approximately 80 percent of the vehicle speed) that would produce the maximum effective braking torque in the instance of braking action at high speed in accordance with the prior art, the actual wheel speed is appreciably higher than the mentioned ideal wheel speed. Thanks to the present invention, however, the actual wheel speed is in the neighborhood of the ideal wheel speed over the entire range of the vehicle speed, as graphically demonstrated in FIG. 21.

As the previously computed difference between the pulse numbers exceeds the predetermined value (8 in this particular embodiment), the pressure-reducing signal is produced, as in FIG. 7. This pressure-reducing signal, amplified by the power amplifier circuit 81, excites the solenoid coil 57 build in the selector valve 30 of the actuator 17, FIG. 11. This reduces the braking torque as aforesaid, so that the difference between the pulse numbers in the first and second halves of the ceratin period is decreased until it attains a negative value, when the pressure-increasing signal is produced as in FIG. 7. Thereupon the excitation of the solenoid coil 57 in the valve 30 of the actuator 17 terminates, so that the various working parts of this actuator 17 becomes inoperative, as illustrated in FIG. 11.

As a result, the aforementioned hydraulic pressure is again delivered which tends to arrest the revolution of the vehicle wheels (see FIG. 9). It will be needless to say that the above described procedure is repeated as the pulses from the vehicle wheels are decreased to such a degree that the comparison circuit 80 produces a pressure-reducing signal.

FIG. 25 illustrates a circuit configuration adoptable in case the number of wheel pulses is simultaneously counted by both the addition counter and the subtraction counter for the same period of time. The overall circuit of FIG. 25 includes four-bit, binary counters B101 and B102, binary decimal decoders G101 and G102, and NAND elements M101 through M110 which have a function of amplification in addition to their intrinsic function as such, producing an output signal in the L level when all the inputs are applied with pulses in the H level, and producing an output signal in the H level when at least one of the inputs is applied with a pulse in the L level, as hereinafter described in detail. Also in FIG. 25, flip-flops F101 through F115 are provided with trigger terminal T, 1 terminal Q, 0 terminal $\overline{Q}$, reset terminal R, set terminal S, and D-type edge trigger D, as indicated in the drawing.

Capacitors C101 and C102, diodes D101 and D102, resistances R101 and R102, and the mentioned NAND elements M101 and M102 combine to constitute a clock-pulse oscillator circuit of prior design, the oscillator circuit having its output connected to the input T of the counter B101. This counter B101 has its output A connected to one of the inputs of the NAND element M103, its output B to the input A of the decoder G101, its output C to the input B of the decoder G101, and its output D to the input C of the decoder G101 and to the input T of the counter B102. The outputs A, B, C and D of this counter B102 are connected to the inputs A, B, C and D of the decoder G102, respectively. The output 0 of the decoder G102, which is so made as to produce 0 and 1 outputs, is connected to the inputs of the NAND elements M104 and M106, while the output of the NAND element M104 is connected to the remaining input of the aforesaid NAND element M103.

The decoder G101, which is so designed as to produce 0 to 7 outputs, has its output 1 connected to the input of the NAND element M105, its output 3 to the inputs S of the respective flip-flops F107 through F112 which in combination constitute the desired subtraction counter, its output 5 to the input of the NAND element 117, and its output 7 to the inputs R of the respective flip-flops F101 through F106 which in combination make up the addition counter. One of the inputs of each of the NAND elements M111 through M116 is connected to the output of the NAND element M117, while the remaining inputs of these NAND elements are respectively connected to the outputs $\overline{Q}$ of the corresponding flip-flops F101 through F106. The outputs of the same NAND elements M111 through M116 are respectively connected to the inputs R of the corresponding flip-flops F107 through F112.

The remaining input of the aforesaid NAND element M106 is connected to an output X of the circuit adapted to convert into pulses the sensor output which is produced in accordance with the rotational state of the vehicle wheels. The output of this NAND element M106 is connected to the inputs T of the respective groups of flip-flops F101 through F106 and F107 through F112.

D-type flip-flops F113 through F115 have their respective inputs T connected to the output of the NAND element M105, and their respective inputs D to the outputs Q of the corresponding flip-flops F 110 through F112. The outputs Q of these D-type flip-flops F113 through F115 are separately connected to the inputs of the NAND element M107, the output Q of only the flip-flop F115 being also connected to the inputs of the NAND elements M108 and M110. The output of the NAND element M107 is connected to the remaining input of the NAND element M108, while the output of this NAND element M108 is connected to one of the inputs of the NAND element M109, which, in combination with the mentioned NAND element M110, constitutes a reset flip-flop. The output of the NAND element M109 is connected to the input of the NAND element M110, which has its output similarly connected to the input of the NAND element M109.

Resistances R103, R104 and R105, transistors T101 and T102, and valve V101 combine to make up a circuit which reduces the hydraulic pressure delivered to the brake mechanisms of the motor vehicle only when the valve V101 carries an electric current. The resistance R103 is connected to the base of the transistor T101, which has its emitter grounded. The collector of the same transistor is connected to the resistances R104 and R105. The resistance R104 is further connected to a power supply (not shown), while the resistance R105 is connected to the base of the transistor T102, whose emitter is connected to the power supply and whose collector is grounded through the valve V101.

Proceeding now to the description of a mode of operation of the above described circuit of FIG. 25, let it first be assumed that the output voltage of the NAND element M102 in the clock-pulse oscillator circuit has increased from 0 to 5 volts. This voltage is impressed on the input terminal of the NAND element M101 through the capacitor C101, with the result that the output voltage of this NAND element M101 becomes zero. The zero output voltage of the NAND element M101 affects the input terminal of the aforesaid NAND element M102 through the capacitor C102 in such a manner that the output voltage of the NAND element M102 is kept elevated to 5 volts.

On the other hand, the output voltage of the capacitor C101 is discharged to the output side of the NAND element M101 through the diode D101 and the resistance R101, the discharge period of the capacitor voltage determining the duration (H level) of the pulses produced by this clock-pulse oscillator circuit. As the output voltage of the capacitor C101 is lowered to about 1.5 volts or less by this discharge, the output voltage of the NAND element M101 is elevated from zero to 5 volts. This high output voltage of the NAND element M101 affects the NAND element M102 through the capacitor C102 in such a manner that its output voltage is lowered from its previously attained 5 volts to zero. The zeroed output voltage of the NAND element M102 correspondingly lowers the input voltage of the NAND element M101 through the capacitor C101, so that the output voltage of the NAND element M101 is kept elevated to 5 volts, while the output voltage of the other NAND element M102 is reduced to zero.

Similarly, the output voltage of the capacitor C102 is discharged to the output side of the NAND element M102 through the diode D102 and the resistance R102, the discharge period of this capacitor voltage determining the duration (L level) of the pulses produced. As the output voltage of the capacitor C102 is lowered to about 1.5 volts or less due to the above discharge, the output voltage of the NAND element M102 is elevated from zero to 5 volts. This high output voltage of the NAND element M102 causes, through the capacitor C101, the NAND element M101 to reduce its output voltage from 5 volts to zero. Thus, while the output voltage of the NAND element M101 is maintained at 5 volts, the output voltage of the other NAND element M102 is kept reduced to zero. The pulses having the preset H and L levels, delivered by the clock pulse oscillator circuit as above-described, are repeatedly counted from zero up to 255 by the aforesaid four-bit, binary counters B101 and B102.

As indicated in FIGS. 26a and 26b, the decoder G102 produces its 0 and 1 outputs, and the decoder G101 its 0 to 7 outputs, as the pulse-counting operation proceeds. The output of the NAND element M106 is controlled by the 0 output of the decoder G102. While this 0 output of the decoder G102 is in the H level, that is, while the counters B101 and B102 are counting from 16th to 255th pulses delivered by the clock-pulse oscillator, the number of wheel pulses is counted simultaneously by the addition counter comprised of the flip-flops F101 through F106 and by the subtraction counter comprised of the flip-flops F107 through F112. When the 1 output of the decoder G101 changes from the H to L level (at the third clock pulse counted), the conditions of the flip-flops F110 through F112 are transferred to the flip-flops F113 through F115. When the 3 output of the decoder G101 turns L (at the 7th clock pulse), all the flip-flops F107 through F112 are set, with the result that the Q outputs become H while the $\overline{Q}$ outputs become L.

When the 5 output of the decoder G101 turns L (at the 11th clock pulse), those of the flip-flops F107 through F112 which correspond to those of the flip-flops F101 through F106 whose $\overline{Q}$ outputs are in the H level are reset so that their $\overline{Q}$ outputs become H. As a result, the number of wheel pulses counted by the flip-flops F101 through F106 while the 16th to 255th clock pulses are being generated is transferred to those flip-flops F107 through F112. When the 7 output of the decoder G101 turns L (at the 15th clock pulse), the flip-flops F101 through F106 are reset, so that, while the 16th to 255th clock pulses are being succeedingly generated, the flip-flops F101 through F106 and the flip-flops F107 and F112 effect addition and subtraction, respectively, of the wheel pulses as previously mentioned.

Consequently, as demonstrated in FIG. 27, the flip-flops F107 through F112 produce their respective Q outputs in response to the values obtained by these flip-flops. Hence, as aforesaid, at the third clock pulse, the conditions of the flip-flops F110 through F112 are transferred to the flip-flops F113 through F115. In accordance with the $\overline{Q}$ outputs of these flip-flops F113 through F115, the NAND elements M107 and M108 have their output levels changed between H and L as in FIG. 27.

The NAND elements M109 and M110 in combination constitute a set-reset flip-flop. When the output of the NAND element M109 is in the H level, the transistor T101 is conductive, so that the base potential of the other transistor T102 is lowered. This causes conduction in that transistor T102, also so that now an electric current flows through the valve V101 to reduce the hydraulic pressure to be delivered to the brake mechanisms of the motor vehicle. When the output of the NAND element 109 is in the L level, on the other hand, the transistor T 101 is nonconductive. The resultantly elevated base potential of the other transistor T102 causes the same to become nonconductive, so that the valve V101 no longer carries a current and hence permits the supply of the hydraulic pressure to the brake mechanisms.

The above considered output of the NAND element M109 is turned H only when the output of the NAND element M108 is in the L level and the $\overline{Q}$ output of the flip-flop F 115in the H level, and is turned L only when the output of the NAND element M108 is in the H level and the $\overline{Q}$ output of the flip-flop F115 in the L level. Further, the output of the NAND element M109 is maintained in the preceding level when the output of the NAND element M108 is in the H level and the $\overline{Q}$ output of the flip-flop F115 in the H level.

The circuit of FIG. 25 having substantially the above described operation, the wheel pulses supplied are counted by the addition counter (flip-flops F101 through F106) for a unit length of time i.e., while from the 16th to 255th clock pulses are being counted) and by the subtraction counter (flip-flops F107 through F112) for the succeeding unit length of time. According to the resultantly obtained number of wheel pulses, the NAND element M109 generates a signal for the control of the valve V101. Further, the precedingly produced control signal is kept unvaried as long as the pulse difference calculated by the subtraction counter is within the range of 0 to 7. It will accordingly be seen that effective braking torque will be produced as desired while the locking of the vehicle wheels is successfully prevented.

Reference will now be made to FIGS. 28 and 29 in order to describe a further embodiment of the present invention, in which the number of wheel pulses is simultaneously counted by both the addition and subtraction counters, and in which a counting period of the addition counter is smaller than that of the subtraction counter. In the present embodiment of the invention, circuit components having substantially the same functions as those of their counterparts in the preceding embodiment of FIGS. 25 are indicated by the letter *a* attached at the end of the precedingly used reference characters. Further, in the succeedingly described configuration of the circuit of FIG. 28, attention is mostly directed to its differences from the foregoing embodiment.

The output 0 of a decoder G102a is connected to the inputs of a NAND element M104a, a NAND element M118 and a NAND element M220, the output 1 of the same decoder is connected to another input of the NAND element M220. The output of this NAND element M220 is connected to the input of a NAND element M221, which has its output connected to an input of a NAND element M119. Another input of each of the aforesaid NAND elements M118 and M119 is connected to an output X of the circuit adapted to convert into pulses the sensor output produced in accordance with the revolution of the vehicle wheels. The output of the NAND element M118 is connected to the input of flip-flops F107a through F112a, while the output of the NAND element M119 is connected to the input of flip-flops F101a through F106a. Other details of construction follow suit after the preceding embodiment of FIG. 25.

When, in the above described circuit configuration of FIG. 28, the 0 output of the decoder G102a is turned H, output from the NAND element M118 causes the subtraction counter comprised of the flip-flops F107a through F112a to start counting the wheel pulses supplied. Also, when the output of the NAND element M221 is turned H, output from the NAND element M119 causes the addition counter comprised of the flip-flops F101a through F106a to start counting the wheel pulses. As indicated in FIG. 29, the flip-flops F107a through F112a makes subtraction of the wheel pulses while counters B101a and B102a are counting from the 16th to 255th clock pulses, while the flip-flops F101a through F106a effect addition of the wheel pulses while the counters are counting from the 32nd to 255th clock pulses. Other operative features of this example will be understood from the operation of the preceding example described in connection with FIGS. 25, 26 and 27.

FIGS. 30 to 33 show a further embodiment of the invention, in which the number of wheel pulses is first counted by the addition counter for a predetermined length of time and then by the subtraction counter for the same predetermined length of time. In this example, also, circuit components having substantially the same functions as those of their counterparts in the foregoing embodiment of FIG. 25 are indicated by the letter $b$ attached at the end of the reference characters used in that drawing.

With reference to FIG. 31 in particular, outputs A, B, C and D of a counter B101b are connected to inputs A, B, C and D, respectively, of a decoder G1101. The output D of the counter B101b is also connected to the input T of a counter B102b. Outputs A, B, C and D of this counter B102b are connected to inputs A, B, C and D, respectively, of a decoder G1102, which is so designed as to produce 0 to 9 outputs. Its outputs 0 through 4 and 9 are connected to the inputs of a NAND element M222, while its outputs 4 through 9 are connected to the inputs of another NAND element M223. A NAND element M224 has its input connected to the output of the NAND element M222, and its output to one of the inputs of a NAND element M235. A NAND element M225 has its input connected to the output of the NAND element M223, and its output to one of the inputs of a NAND element M236. A NAND element M226 has its input connected to the output 9 of the decoder G1102, and its output to one of the inputs of a NAND element M228. A NAND element M227 has its input connected to the output 4 of the decoder G1102, and its output to one of the inputs of each of NAND elements M232, M233 and 234.

The aforesaid decoder G1101 is so adapted as to produce 0 to 9 outputs, havings its output 2 connected to the input of a NAND element 231, its output 5 to the input of a NAND element M230, and its output 8 to the input of a NAND element M229. The output of the NAND element M229 is connected to another input of each of the NAND elements M234 and M228. The output of the NAND element M230 is connected to another input of the NAND element M233. The output of the NAND element M231 is connected to another input of the NAND element M232. The NAND element M228 has its output connected to the input of a NAND element M237, while this NAND element M237 has its output connected to inputs T of flip-flops F113b through F115b. The output of the NAND element M232 is connected to inputs S of flip-flops F107b through F112b which, in combination, constitute a subtraction counter. The output of the NAND element M233 is connected to the input of a NAND element M238, while the output of this NAND element M238 is connected to one of the inputs of each of NAND elements M111b through M116b.

The output of the NAND element M234 is connected to inputs R of flip-flops F101b through F106b combinedly constituting an addition counter. Output $\overline{Q}$ of each of these flip-flops is connected to another input of the corresponding one of the aforesaid NAND elements M111b through M116b, while the outputs of these NAND elements are connected to inputs R of the corresponding flip-flops F107b through F112b. The NAND elements M235 and M236 have their inputs connected to an output X of the circuit adapted to convert into pulses the sensor output produced in accordance with the revolution of the vehicle wheels. The output of the NAND element M235 is connected to the input of the flip-flops F107b through F112b, while the output of the NAND element M236 is connected to the input of the flip-flops F101b through F106b. Other details of organization are substantially identical to those set forth previously in relation to FIG. 25 in particular.

In the above described circuit of FIG. 31, the pulses delivered by the clock-pulse oscillator circuit are repeatedly counted by the counters B101b and B102b from 0 to 99. FIG. 33 lists the truth-values as indicated by these counters. In accordance with the pulse-counting operation, the decoders G1101 and 1102 produce their 0 to 9 outputs, as shown in the truth table of FIG. 32. FIG. 30 is a graph plotted by way of explanation of the operation of the present embodiment of the invention. When the 4 to 9 outputs of the decoder G1102 are in the $h$ level, i.e., when the output of the NAND element M223 is in the L level and the output of the NAND element M225 in the H level, the wheel pulses are counted by the addition counter comprised of the flip-flops F101b through F106b. In other words, the wheel pulses are counted only while the counters B101b and B102b are counting the clock pulses from No. zero to the 39th. As the 2 output of the decoder G1101 and the 4 output of the decoder G1102 are both turned L (at the 42nd clock pulse), all the flip-flops F107b through F112b of the subtraction counter are set, so that their Q outputs turn H while their $\overline{Q}$ outputs turn L.

When the 5 output of the decoder G1101 and the 4 output of the decoder G1102 both become L (at the 45th clock pulse), those of the flip-flops F107b through F112b which correspond to those of the flip-flops F101b through F106b whose $\overline{Q}$ outputs are in the H level are reset, so that the $\overline{Q}$ outputs of these flip-flops turn H. As a result, the wheel pulses counted by the flip-flops F101b through F106b while the clock pulse No. zero to the 39th clock pulse are being counted are transferred to the flip-flops F107b through F112b.

When the 8 output of the decoder G1101 and the 4 output of the decoder G1102 both become L (at the 48th clock pulse), the flip-flops F101b through F106b are reset. When the 0 to 4 outputs as well as 9 output of the decoder G1102 are all in the H level, i.e., when the output of the NAND element M222 is in the L level and the output of the NAND element M224 in the H level, the wheel pulses are counted by the subtraction counter comprised of the flip-flops F107b through F112b. That is to say, the wheel pulses are counted only while the counters B101b and B102b are counting from the 50th to 89th clock pulse. The conditions of the flip-flops F110b through F112b are transferred to the flip-flops F113b through F115b when both the 8 output of the decoder G1101 and the 9 output of the decoder G1102 turn L (at the 98th clock pulse). Other details of operation are substantially identical with those already described with reference to FIGS. 25 to 27.

FIGS. 34 and 35 illustrate a still further embodiment of the invention, wherein the number of wheel pulses is counted by the addition counter for a first prescribed length of time and then by the subtraction counter for a second prescribed length of time, which is longer than the first prescribed length of time. In the connection diagram of FIG. 35, circuit components having substantially the same functions as those of their counterparts in the preceding example of FIG. 31 are indicated by the mark "'" attached as a subscript at the end of the reference characters used in the latter drawing. This embodiment of FIG. 35 differs from that of FIG.

31 only in that the 3 output of a decoder G1102' is connected to the inputs of both NAND elements M222' and M223'.

Therefore, as is obvious from the graph of FIG. 34, the wheel pulses are counted only when the 3 to 9 outputs of the decoder G1102' are in the L level, i.e., while counters B101b' and B102b' are counting the clock pulses from 0 to 29. Other details of operation will be apparent from the precedingly described operation of the embodiment of FIGS. 30 to 33. It will also be understood that the wheel pulses are counted by the addition counter comprised of flip-flops F101b' through F106b' for a shorter length of time than they are by the subtraction counter comprised of flip-flops F107b' through F112b'.

We claim:

1. A digital-type brake-control method for controlling a hydraulic brake system in a vehicle, which method comprises: detecting the rotational state of at least one wheel of the vehicle to produce a detection output; converting said output into a pulse signal; comparing and calculating the difference between the number of pulses of said pulse signal counted from any first time instant for a specific and predetermined first time period and the number of said pulses counted from a time instant differing from said first time instant for a specific second time period; determining as to whether said difference pulse number is greater or less than a predetermined reference pulse number, by means of an output signal; and producing a pressure-reduction signal or pressure-increase signal in accordance with and represetnative of said output signal thereby to decrease or increase hydraulic pressure in said brake system.

2. A digital-type brake-control method as claimed in claim 1 in which said predetermined first time period is equal to said second time period.

3. A digital-type brake-control method as claimed in claim 1 in which said predetermined first time period is different from said second time period.

4. A digital-type brake-control system for controlling a hydraulic brake system in a vehicle, said brake-control system comprising:
sensor means for detecting the rotational state of at least one wheel of the vehicle and producing a corresponding output signal;
a conversion circuit for converting said output signal into a wheel pulse signal;
an addition-subtraction circuit for determining the difference between the number of pulses of said wheel pulse signal counted from any first time instant for a specific first time period and the number of said pulses counted from a time instant differing from said first time instant for a specific second time period;
AND circuits for sending the wheel pulse signal to said addition-subtraction circuit;
a control circuit for producing control signals for controlling said AND circuits and the addition-subtraction circuit;
a comparison circuit for comparing said difference between numbers of counted pulses with a predetermined number of pulses thereby to produce a pressure variation signal depending on the result of the comparison;
a power amplifier circuit for amplifying said pressure variation signal; and
an actuator for receiving said pressure variation signal thus amplified and varying the hydraulic pressure in said hydraulic brake system in accordance with said pressure variation signal.

5. A digital-type brake-control system as claimed in claim 4 in which:
said control circuit comprises
a clock-pulse oscillator for continually transmitting a signal of a constant frequency,
a free-running counter for counting said frequency to produce a corresponding output, and
a decoder for control for generating said control signals in response to said output,
said control signals comprising
a reset signal, an addition signal, a gate signal, a subtraction signal, and a set signal;
said addition-subtraction circuit comprising:
an addition counter which is reset by said reset signal, and in which addition of the number of the pulses of said wheel pulse signal is carried out when one of the AND circuits is placed in the open state by said addition signal,
a gate circuit placed in the open state by said gate signal,
a subtraction counter in which the result of said addition in the addition counter is set when the gate circuit is thus opened, and in which, moreover, the number of said wheel pulses is subtracted to determine the number of difference pulses relative to the result of the addition when the other AND circuit is opened by said subtraction signal, and
a register circuit in which said number of difference pulses is set by said set signal, and which produces output pulses; and
said comparison circuit comprising:
a decoder circuit means for comparing the number of the output pulses from said register circuit with the predetermined number of pulses thereby to generate the pressure variation signal and
a hysteresis circuit operating when the pressure variation signal from the decoder circuit means is applied thereto to continue transmitting the pressure variation signal of the instant state until the succeeding pressure variation signal is applied thereto.

6. A digital-type brake-control system as claimed in claim 4 in which said addition-subtraction circuit comprises a reversible counter which is reset by said reset signal and operates to add the number of wheel pulses when the addition signal is applied to an AND circuit and to subtract the number of wheel pulses when the subtraction signal is applied to the AND circuit thereby to determine the number of difference pulse relative to the result of the addition and a register circuit in which said number of difference pulses is set by said set signal.

7. A digital-type brake-control system as claimed in claim 4 in which said addition-subtraction circuit comprises an addition counter and a subtraction counter respectively operating to carry out simultaneously addition and subtraction of the wheel pulse signal from any time instant for a specific time period in response to the control signals, said subtraction counter being adapted to determine the difference pulse number relative to the result of the addition by the addition counter in the specific time period of the preceding divisional period of the said specific time period.

8. A digital-type brake-control system as claimed in claim 7 in which said addition-subtraction circuit comprises:
a gate circuit opened by the gate signal of the control circuit;
the subtraction counter in which the pulse count obtained by the addition counter is set when the gate circuit is opened;
the addition counter which is reset by the reset signal of the control circuit,
said addition counter and subtraction counter being adapted to carry out simultaneous addition and subtraction, respectively, of the number of wheel pulses when respective AND circuits are respectively opened by addition and subtraction signals generated simultaneously by the control circuit, whereby in the subtraction counter, the difference number of pulses relative to the set pulse count is determined; and
a register in which said difference number of pulses is set by a set signal from the control circuit.

9. A digital-type brake-control system as claimed in claim 8 in which said control circuit comprises a clock-pulse oscillator for continually transmitting a signal of a constant frequency, a free-running counter for counting said frequency thereby to produce a corresponding output, and a decoder for control for transmitting said control signals in response to said output of the free-running counter, said free-running counter comprising a plurality of flip-flops controlled in ON-OFF operation by said signal transmitted by the clock-pulse oscillator to produce respective outputs, said decoder for control being adapted to generate simultaneously the addition and subtraction signals in accordance with the outputs of the filp-flops, the flip-flops being set in ON-OFF states in a manner such that the period of generation of the subtraction signal is longer than that of the addition signal.

10. A digital-type brake-control system as claimed in claim 4 in which said specific second time period is longer than said specific first time period of the addition-subtraction circuit.

11. A digital-type brake-control system as claimed in claim 10 in which:
said control circuit comprises
a clock-pulse generator for continually transmitting a signal of a constant frequency,
a free-running counter for counting said frequency to produce a corresponding output, and
a decoder for control for transmitting said control signals in response to said output,
said control signals including an addition signal and a subtraction signal; and
said addition-subtraction circuit comprises
an addition counter for adding said number of wheel pulses when one of said AND circuits is opened upon transmission of said addition signal and
a subtraction counter for subtracting the number of wheel pulses when the other AND circuit is opened upon transmission of said subtraction signal,
said free-running counter comprising a plurality of flip-flops controlled in ON-OFF operation by the signal transmitted by the clock-pulse generator and thereby producing an output,
said decoder for control generating the addition signal and the subtraction signal in accordance with the output of the flip-flops,
the flip-flops being set in ON-OFF states in a manner such that the period of generation of the subtraction signal is longer than that of the addition signals.

12. A digital-type brake-control system as claimed in claim 4 in which said sensor means comprises a plurality of sensors provided respectively with respect to a plurality of wheels of the vehicle and producing respective output signals corresponding to the rotational states of the respective wheels, and said conversion circuit is adapted to add electrically said output signals, to waveshape the resulting signal, and to convert the signal thus wave-shaped into the wheel pulse signal.

13. A digital-type brake-control system as claimed in claim 12 in which said conversion circuit comprises amplifier circuits for respectively amplifying the output signals of the plurality of sensors, differentiating circuits for respectively differentiating the outputs of the amplifier circuits and producing corresponding differentiated outputs, and NAND elements for generating the numbers of wheel pulses in response to said differentiated outputs.

14. A digital-type brake-control system as claimed in claim 12 in which said conversion circuit comprises amplifier circuits for respectively amplifying the output signals of the plurality of sensors, Schmitt circuits for operating in response respectively to the outputs of the amplifier circuits to produce, each, a pair of outputs in mutually opposite phase relationship, differentiating circuits for respectively differentiating the pairs of outputs of the Schmitt circuits, and NAND elements for generating the numbers of wheel pulses in response to the outputs of the differentiating circuits.

* * * * *